United States Patent
Kazui et al.

(10) Patent No.: US 9,083,993 B2
(45) Date of Patent: Jul. 14, 2015

(54) VIDEO/AUDIO DATA MULTIPLEXING APPARATUS, AND MULTIPLEXED VIDEO/AUDIO DATA DECODING APPARATUS

(71) Applicant: FUJITSU LIMITED, Kawasaki-shi, Kanagawa (JP)

(72) Inventors: Kimihiko Kazui, Kawasaki (JP); Satoshi Shimada, Kawasaki (JP); Junpei Koyama, Shibuya (JP); Shunsuke Kobayashi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/155,770

(22) Filed: Jan. 15, 2014

(65) Prior Publication Data

US 2014/0201798 A1 Jul. 17, 2014

(30) Foreign Application Priority Data

Jan. 16, 2013 (JP) ................................ 2013-005764

(51) Int. Cl.
*H04J 3/04* (2006.01)
*H04N 7/173* (2011.01)
(Continued)

(52) U.S. Cl.
CPC ..... *H04N 21/23614* (2013.01); *H04N 21/2368* (2013.01); *H04N 21/434* (2013.01); *H04N 21/4307* (2013.01); *H04N 21/4341* (2013.01); *H04N 21/8547* (2013.01)

(58) Field of Classification Search
CPC ................... H04N 21/23614; H04N 21/2368; H04N 21/4307; H04N 21/8547; H04N 21/434; H04N 21/4341
USPC ......... 370/350, 503, 509, 510, 512, 535, 537; 375/240.01, 240.02, 240.12, 240.13, 375/240.15, 240.16, 240.21, 240.28; 725/116
See application file for complete search history.

(56) References Cited

U.S. PATENT DOCUMENTS

| | | | | |
|---|---|---|---|---|
| 6,970,514 | B1 * | 11/2005 | Nagumo et al. | 375/240.27 |
| 2002/0016970 | A1 * | 2/2002 | Negishi et al. | 725/88 |

(Continued)

FOREIGN PATENT DOCUMENTS

WO 2010/119171 A1 10/2010

OTHER PUBLICATIONS

M. Bosi, et al., Information technology—International Organization for Standardization Organisation Internationale De Normalisation ISO/IEC JTC1/SC29/WG11, Coding of Moving Pictures and Audio, ISO/IEC JTC1/SC29./WG11 N1430. MPEG-2 DIS 13818-7 (MPEG-2 Advanced Audio Coding, AAC), Nov. 1996.

(Continued)

*Primary Examiner* — Hoang-Vu A Nguyen-Ba
(74) *Attorney, Agent, or Firm* — Fujitsu Patent Center

(57) ABSTRACT

A video multiplexing apparatus includes: a control unit which determines first decode/display time information and second decode/display time information for each picture in video data and for each encoding unit of first media data; a video packet generating unit which appends the first and second decode/display time information for the picture to encoded data of the video data; and a media packet generating unit which appends the first and second decode/display time information for the encoding unit to encoded data of the first media data. The first decode/display time information is used when the decoding unit of the video data is a picture, and the second decode/display time information is used when the decoding unit is a sub-picture. The picture display time based on the second decode/display time information is earlier than the picture display time based on the first decode/display time information.

20 Claims, 21 Drawing Sheets

(51) Int. Cl.
*H04N 21/236* (2011.01)
*H04N 21/434* (2011.01)
*H04N 21/2368* (2011.01)
*H04N 21/43* (2011.01)
*H04N 21/8547* (2011.01)
*H04J 3/06* (2006.01)
*H04J 3/02* (2006.01)
*H04N 11/02* (2006.01)

(56) References Cited

U.S. PATENT DOCUMENTS

2003/0194213 A1* 10/2003 Schultz et al. .............. 386/95
2007/0096481 A1* 5/2007 Huang ......................... 292/342
2008/0158254 A1* 7/2008 Jiang ........................... 345/629

OTHER PUBLICATIONS

ITU-T,"Information technology—Series H: Audiovisual and Multimedia Systems, Infrastructure of audiovisual—Coding of moving video. Advanced video coding for generic audiovisual services", H.264, Jan. 2012.

ITU-T, Information technology—Series H: Audiovisual and Multimedia Systems, Infrastructure of audiovisual services—Transmission multiplexing and synchronization. Information technology—Generic coding of moving pictures and associated audio information: Systems—International Standard 13818-1, ITU-T Recommendation H.222.0 (2006).

B. Bross, et al., Information technology—International Organization for Standardization Organisation Internationale De Normalisation ISO/IEC JTC 1/SC 29/WG 11, Coding of Moving Pictures and Audio, ISO/IEC JTC1/SC29/WG11, MPEG 2012/N13155, Study Text of ISO/IEC DIS 23008-2 High efficiency Video Coding, ISO/IEC DIS 23008-2, Oct. 2012.

ITU-T, "Pulse Code Modulation (PCM) of Voice Frequencies", ITU G.711, 1990.

K. Grüneberg, et al., International Organisation for Standardisation Organisation Internationale De Normalisation ISO/IEC JTC1/SC29/WG11, Coding of Moving Pictures and Audio, ISO/IEC JTC1/SC29/WG11 MPEG102/N13026, "Transport of HEVC Video over MPEG-2 Systems", Oct. 2012.

T Schierl, et al; "System Layer Integration of HEVC", 3GPP DRAFT; S4-121322; Oct. 31, 2012; pp. 1-13; XP050687116; IEEE.
Wang, et al; "AHG9: HEVC HRD cleanups";12. JCT-VC Meeting; 103.MPEG Meeting; Jan. 14-23, 2013 Geneva; (Joint Collaborative Team on Video Coding of ISO/IEC JTC1/SC29/WG11 and ITU-T SG. No. JCTVC-L0044; Jan. 8, 2013.

Kazui, et al; "AHG9: Low delay display hint SEI"; 102. MPEG Meeting; Oct. 10-19, 2012; Shanghai; (Motion Picture Expert Group or ISO/IEC JTC1/SC29/WG11); Oct. 10, 2012.

ESR—European Search Report of European Patent Application No. 14151135.2 dated Apr. 7, 2014.

* cited by examiner

| | | |
|---|---|---|
| PacketStartCodePrefix = 0x000001 | TrickModeControl | P-STDBufferScale |
| StreamID | FieldId | P-STDBUfferSize |
| PESPacketLength | IntraSliceRefresh | |
| | FrequencyTruncation | PESExtensionFieldLength |
| PESScrambleControl | RepCntrl | StreamIdExtensionFlag |
| PESPriority | FieldId | StreamIdExtension |
| DataAlignmentIndicator | AdditionalCopyInfo | TREFExtensionFlag |
| CopyRight | PreviousPESPacketCRC | TREF |
| OriginalOrCopy | | AlternativePTSDTFlag |
| PTSDTSFlag | PESPrivateDataFlag | SecondPTS |
| ESCRFlag | PackHeaderFieldFlag | SecondDTS |
| ESRateFlag | ProgramPacketSequenceCounterFlag | |
| DSMTrickModeFlag | P-STDBufferFlag | StuffByte |
| AdditionalCopyInfoFlag | PESExtensionFlag2 | |
| PESCRCFlag | PESPrivateData | PESPacketDataByte |
| PESExtensionFlag | PackFieldLength | |
| PESHeaderDataLength | PackHeader | |
| PTS | ProgramPacketSequenceCounter | |
| DTS | MPEG1MPEG2Indicator | |
| ESCR | OriginalStuffLength | |
| ESRate | | |

VIDEO/AUDIO DATA MULTIPLEXING APPARATUS, AND MULTIPLEXED VIDEO/AUDIO DATA DECODING APPARATUS

CROSS-REFERENCE TO RELATED APPLICATION

This application is based upon and claims the benefit of priority of the prior Japanese Patent Application No. 2013-005764, filed on Jan. 16, 2013, the entire contents of which are incorporated herein by reference.

FIELD

The embodiments discussed herein are related to a video multiplexing apparatus and video multiplexing method for generating multiplexed data from video data and other media data, and also to a multiplexed video decoding apparatus and multiplexed video decoding method for decoding the multiplexed data.

BACKGROUND

Generally, in digital television broadcasting, a digital multiplexing scheme is employed that is specified in the MPEG-2 Systems standard defined in ISO/IEC 13818-1, "Information technology—Generic coding of moving pictures and associated audio information: Systems," 2006, as one video and audio data multiplexing standard.

FIG. 1 is a diagram schematically illustrating the configuration of a video multiplexing apparatus that multiplexes video and audio data in the TS (Transport Stream) format specified by the MPEG-2 Systems. The video multiplexing apparatus 100 includes a video encoding unit 101, a video packet generating unit 102, an audio encoding unit 103, an audio packet generating unit 104, a control unit 105, a system packet generating unit 106, and a packet multiplexing unit 107.

The video encoding unit 101 encodes and compresses the input video data in accordance with a prescribed encoding method, for example, the AVC standard defined in ISO/IEC 14496-10, "Information technology—Coding of audio-visual objects—Part 10: Advanced Video Coding," 2010. The video packet generating unit 102 packetizes the encoded and compressed video data into PES (Packetized Elementary Stream) packets. The PES packet format is such that a PES header carrying picture display time, etc., is appended for every one or for every predetermined number of pictures in the video data. The video data packetized into the PES packets is further packetized into TS packets each having a fixed length of 188 bytes. The TS packet format is such that a TS header is appended to a TS payload containing data into which a PES packet is split. The TS header contains payload identification information PID. The TS header further carries, for example, a program clock reference (PCR) value for reproducing the system time clock (STC) value of the video multiplexing apparatus 100. The PCR value must be strictly determined according to the insertion position (byte position) in the TS stream (TS packet stream). To this end, necessary information is exchanged between the video packet generating unit 102 and the packet multiplexing unit 107.

The audio encoding unit 103 encodes and compresses the input audio data in accordance with a prescribed encoding method, for example, the MPEG-2 AAC standard defined in ISO/IEC 13818-7, "Information technology—Generic coding of moving pictures and associated audio information—Part 7: Advanced Audio Coding (AAC)," 2006.

The audio packet generating unit 104 packetizes the encoded and compressed audio data into PES packets and TS packets. The audio PES packet format is such that a PES header is appended for every one audio frame (1024 samples).

The control unit 105 controls the operation of the video encoding apparatus 100. The control unit 105 has a 27-MHz STC which provides the reference clock for synchronization control. The control unit 105 determines the display time of each picture by taking the STC value at the vertical synchronization signal V-Sync timing of the input video data. It also determines the reproduction time of each audio frame by taking the STC value at the first sample timing of the audio frame in the input audio data.

The system packet generating unit 106 generates TS packets which store program specific information (PSI) as system information. The PSI includes a program association table (PAT) which carries a list of multiplexed programs, a program map table (PMT) which carries the PIDs of the video or audio data in each program, etc. The PID of the PAT is specified to be "0".

The packet multiplexing unit 107 multiplexes together the video TS packets output from the video packet generating unit 102, the audio TS packets output from the audio packet generating unit 104, and the system TS packets output from the system packet generating unit 106. The packet multiplexing unit 107 thus produces a TS stream, which is output. The multiplexing of the packets is performed by conforming to the System Target Decoder (STD) specification defined in the MPEG-2 Systems standard. For example, the video TS packets are multiplexed so that each video TS packet will arrive at the STD at a time earlier than the display time specified by the PES header.

FIG. 2 is a diagram schematically illustrating the configuration of a multiplexed video decoding apparatus that decodes the video and audio data multiplexed in the TS format specified by the MPEG-2 Systems, and that displays the video data while reproducing the audio data. The multiplexed video decoding apparatus 200 includes a packet demultiplexing unit 201, a system packet processing unit 202, a control unit 203, a video packet processing unit 204, a video decoding unit 205, an audio packet processing unit 206, and an audio decoding unit 207.

The packet demultiplexing unit 201, working in conjunction with the system packet processing unit 202, identifies, based on the header information of each TS packet, the type of the data contained in the payload part of the TS packet. Then, the packet demultiplexing unit 201 passes the video PES packets to the video packet processing unit 204 and the audio PES packets to the audio packet processing unit 206, while passing the PSI information to the system packet processing unit 202. Further, the packet demultiplexing unit 201 passes the PCR value carried in the TS header to the control unit 203 together with its byte position information.

The system packet processing unit 202 analyzes the PSI information carried in the payload part of the system TS packet, acquires the PIDs of the video and audio data contained in the program to be decoded, and passes the PIDs to the packet demultiplexing unit 201.

The video packet processing unit 204 extracts the encoded video data contained in the payload of each video PES packet stored in the payload of the video TS packet received from the packet demultiplexing unit 201, and passes the encoded video data to the video decoding unit 205. Further, the video packet processing unit 204 passes the picture display time, etc., retrieved from the PES packet header to the control unit 203.

The audio packet processing unit 206 extracts the encoded audio data contained in the payload of each audio PES packet stored in the payload of the audio TS packet received from the packet demultiplexing unit 201, and passes the encoded audio data to the audio decoding unit 207. Further, the audio packet processing unit 206 passes the audio frame display time, etc., retrieved from the PES packet header to the control unit 203.

Like the control unit 105, the control unit 203 has a 27-MHz reference clock STC. The control unit 203 decodes the STC value based on the PCR value received from the packet demultiplexing unit 201, and performs processing for synchronization. When the picture display time and the audio frame display time received from the video packet processing unit 204 and the audio packet processing unit 206, respectively, are equal to the STC value, the control unit 203 instructs the video decoding unit 205 and the audio decoding unit 207, respectively, to perform decoding.

The video decoding unit 205 and the audio decoding unit 207 each decode the picture or audio frame in accordance with the decode instruction from the control unit 203, and output the decoded picture or decoded audio frame, respectively.

SUMMARY

In the MPEG-2 Systems standard defined in ISO/IEC 13818-1, "Information technology—Generic coding of moving pictures and associated audio information: Systems," 2006, the display time of the video and audio data is described using a presentation time stamp (PTS). The PTS is time information with a resolution of 90 kHz that is assigned to one or more pictures in the video data and one or more audio frames in the audio data.

In the STD specification defined in the MPEG-2 Systems standard, when there is no frame reordering which would be needed at the time of bidirectional picture prediction, each picture in the encoded video data is instantaneously decoded and displayed at the time specified by the PTS. In other words, the decode time is the same as the display time. Each encoded video picture in the multiplexed data needs to be multiplexed so that all the encoded data of the picture will be transmitted to the multiplexed video decoding apparatus at a time earlier than the time specified by the PTS.

On the other hand, when frame reordering is needed, the decode time is explicitly indicated in the encoded video data by using a decoding time stamp (DTS), since the decode time differs from the display time. In this case, each encoded video picture in the multiplexed data needs to be multiplexed so that all the encoded data of the picture will be transmitted to the multiplexed video decoding apparatus at a time earlier the time specified by the DTS. Frame reordering is used in applications where coding efficiency is more important than eliminating data delays. Since frame reordering causes delays by one or more picture times, frame reordering is not used in applications where data delays are not acceptable. In the present specification, the following description is given primarily based on the assumption that frame reordering is not performed.

In the STD specification, the decoding of a picture is completed instantaneously. On the other hand, the video decoding unit contained in the actual multiplexed video decoding apparatus generally takes one picture time to decode a picture. Since it is normal to start the display of the decoded picture after the decoding of the picture is done, the actual apparatus starts to display the picture with a delay of one picture time from the PTS.

FIG. 3 is a diagram illustrating the processing timing for one picture in the video multiplexing apparatus and the multiplexed video decoding apparatus according to the MPEG-2 Systems TS format of the prior art. Referring to FIG. 3, an explanation will be given of how a delay (hereinafter referred to as codec delay) occurs between the input of the picture to the video multiplexing apparatus and the output of the picture from the multiplexed video decoding apparatus according to the prior art. In FIG. 3, the horizontal axis represents the elapsed time expressed in STC value. Block 301 indicates the time that elapses from the moment the picture is input to the video multiplexing apparatus until the transmission of the picture is completed, and block 302 indicates the time that elapses from the start of the reception of the picture at the multiplexed video decoding apparatus until the display of the picture is completed.

The video multiplexing apparatus starts to receive the input picture when the STC value is t1, and captures the picture over a period of one picture time (for example, 33 milliseconds when the picture rate is 29.97 Hz). After capturing the picture, the video multiplexing apparatus encodes the input picture over a period of one picture time. After encoding the picture, the video multiplexing apparatus starts to transmit the encoded picture data. In constant bit rate (CBR) mode, the average value of the transmission time of one picture is equal to one picture time. In this case, the video multiplexing apparatus writes the PCR value in the TS packet header so that the STC value will become, for example, 400 at the multiplexed video decoding apparatus end. The PTS of the picture is set to t1.

On the other hand, the multiplexed video decoding apparatus starts decoding at time t1 when the reception of the encoded picture data is completed. The multiplexed video decoding apparatus decodes the picture over a period of one picture time. After decoding the picture, the multiplexed video decoding apparatus displays the decoded picture over a period of one picture time. As a result, the codec delay is equal to four picture times (for example, 132 milliseconds when the picture rate is 29.97 Hz).

In a conventional bidirectional video communication system, for example, in a videoconferencing system, a delay of about 100 milliseconds in one direction may be annoying to users in a situation where the user at one end begins to speak after waiting for the user at the other end to finish speaking. However, in a situation where a plurality of users at both ends speak simultaneously, a delay of about 100 milliseconds can be annoying to the users.

In other applications, for example, when operating a remotely controlled robot based on the video captured by the robot, it is preferable to minimize the delay between the input of a picture at the remotely controlled robot and the display of the picture at the remote control terminal; for example, it is preferable to reduce the delay to about one picture time or less. However, it is difficult to apply the existing MPEG-2 Systems to applications that demand ultra-low delays by reducing the codec delay to about one picture time or less.

According to one embodiment, a video multiplexing apparatus for multiplexing video data with first media data other than video is provided. The video multiplexing apparatus includes: a control unit which determines, for each picture in the video data and for each encoding unit of the first media data, first decode/display time information and second decode/display time information each for determining the decode time and display time of the picture and the encoding unit; a video packet generating unit which appends the first decode/display time information and second decode/display time information for the picture to a video packet that carries encoded data of the video data; a media packet generating unit which appends the first decode/display time information and second decode/display time information for the encoding unit to a media packet that carries encoded data of the first media data; and a packet multiplexing unit which generates a data stream by multiplexing the video packet and the media packet and outputs the data stream.

The first decode/display time information includes information indicating a time at which to display the video data and the first media data in synchronized fashion when the decoding unit of the video data is a picture. On the other hand, the second decode/display time information includes information indicating a time at which to display the video data and the first media data in synchronized fashion when the decoding unit of the video data is a sub-picture obtained by dividing the picture into a plurality of sub-pictures. The decode time and display time of the picture determined based on the second decode/display time information are earlier than the decode time and display time of the picture determined based on the first decode/display time information.

According to another embodiment, a multiplexed video decoding apparatus for decoding multiplexed data generated by multiplexing encoded video data with encoded first media data other than video is provided. The multiplexed video decoding apparatus includes: a control unit which determines decode time and display time for each picture in the video data and for each encoding unit of the first media data contained in the multiplexed data, based on first decode/display time information and second decode/display time information each for determining the decode time and display time of the picture and the encoding unit; a video decoding unit which, for each picture, starts to decode the picture in accordance with the decode time determined for the picture and starts to display the picture in accordance with the display time determined for the picture; and a media decoding unit which, for each encoding unit, starts to decode the encoding unit in accordance with the decode time determined for the encoding unit and starts to output the encoding unit in accordance with the display time determined for the encoding unit.

The first decode/display time information includes information indicating a time at which to display the video data and the first media data in synchronized fashion when the decoding unit of the video data is a picture. On the other hand, the second decode/display time information includes information indicating a time at which to display the video data and the first media data in synchronized fashion when the decoding unit of the video data is a sub-picture obtained by dividing the picture into a plurality of sub-pictures. The decode time and display time of the picture determined based on the second decode/display time information are earlier than the decode time and display time of the picture determined based on the first decode/display time information.

The object and advantages of the invention will be realized and attained by means of the elements and combinations particularly indicated in the claims.

It is to be understood that both the foregoing general description and the following detailed description are exemplary and explanatory and are not restrictive of the invention, as claimed.

BRIEF DESCRIPTION OF DRAWINGS

FIG. 17 is a diagram illustrating the structure of a PES packet according to a third embodiment.

DESCRIPTION OF EMBODIMENTS

Figure 1:
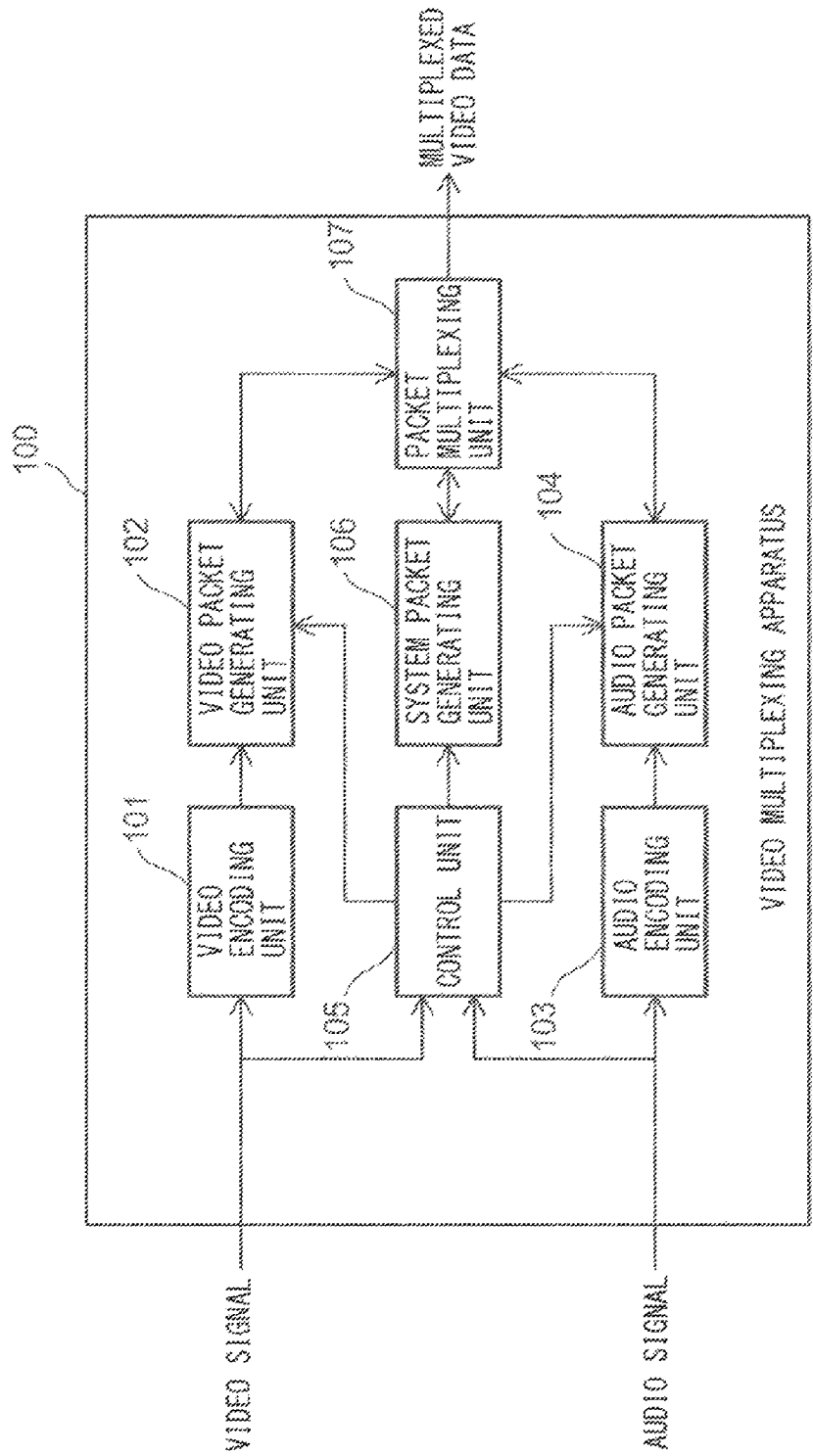
FIG. 1 is a diagram schematically illustrating the configuration of a video multiplexing apparatus according to the MPEG-2 Systems TS format of the prior art.
Figure 2:
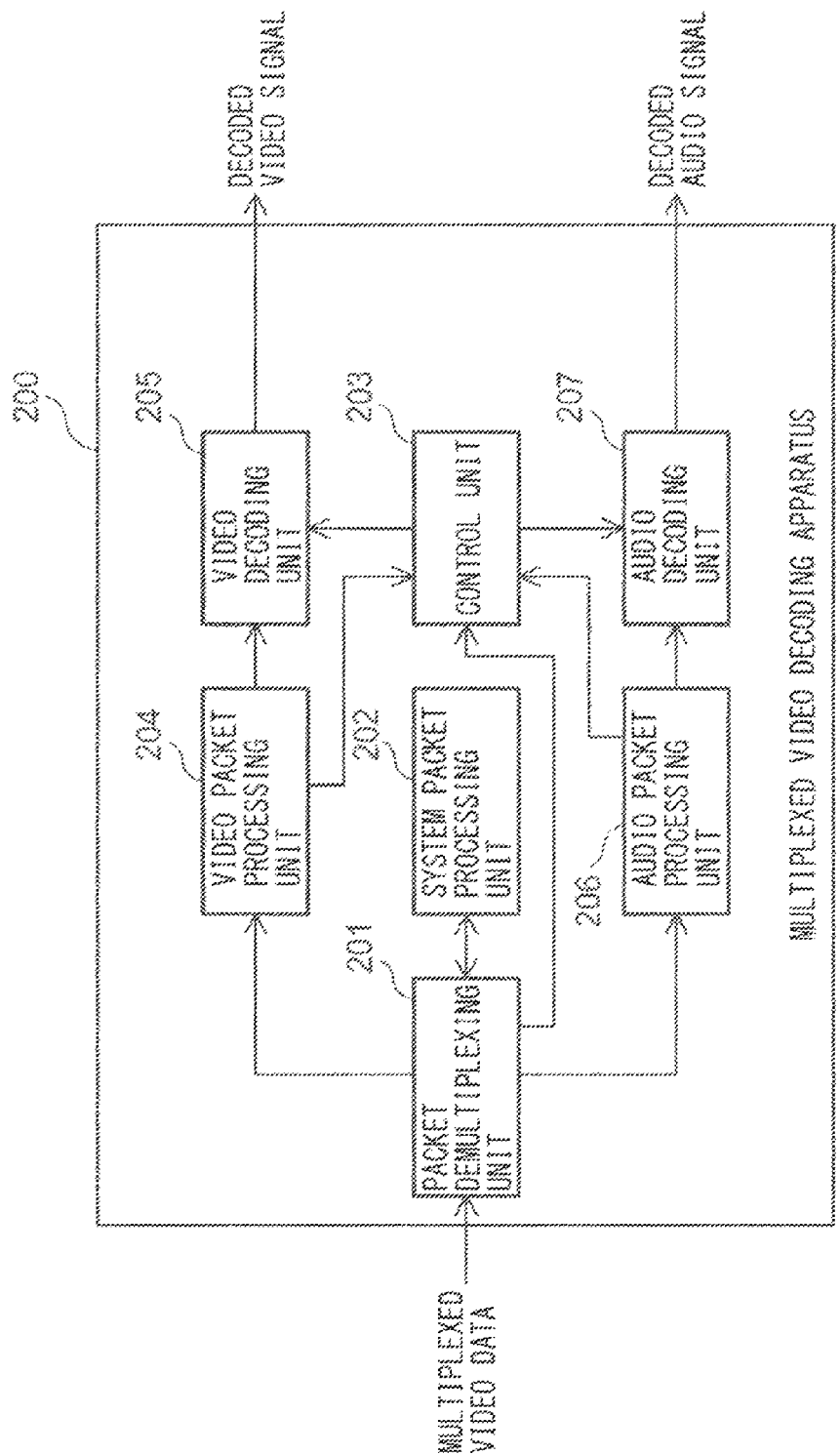
FIG. 2 is a diagram schematically illustrating the configuration of a multiplexed video decoding apparatus according to the MPEG-2 Systems TS format of the prior art.
Figure 3:
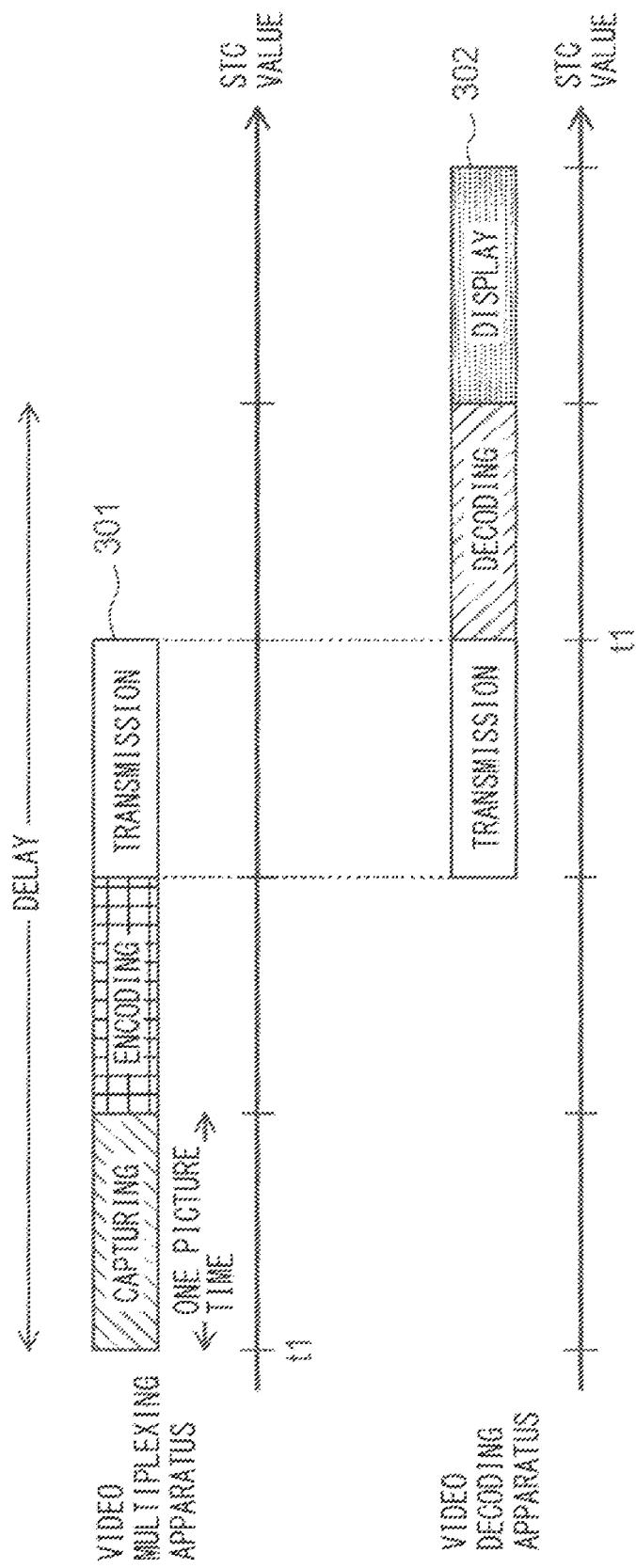
FIG. 3 is a diagram illustrating the processing timing for one picture in the video multiplexing apparatus and the multiplexed video decoding apparatus according to the MPEG-2 Systems TS format of the prior art.

A video multiplexing apparatus according to a first embodiment will be described below with reference to drawings. The video multiplexing apparatus encodes video data and other media signals and multiplexes them together so that they can be decoded and displayed with ultra-low delay at a multiplexed video decoding apparatus, and outputs the thus multiplexed data stream.

From the viewpoint of video coding, one approach to reducing the codec delay is to enable a video decoder to start decoding encoded data upon arrival of a portion of the encoded data without waiting until all the encoded data of one picture arrive. The codec delay can be reduced with this approach because, in the actual video decoder, the decoding of the entire picture can be completed earlier, i.e., the time at which the display of the picture can be started is earlier, than when the decoding is started after all the encoded data of one picture have arrived.

However, when the encoded video data corresponding to each of the plurality of blocks into which one picture has been divided will arrive at the video decoder is not specified by any existing video coding standard, for example, the AVC standard defined in ISO/IEC 14496-10, "Information technology—Coding of audio-visual objects—Part 10: Advanced Video Coding," 2010. In the worst case, the number of bits in the encoded data of the blocks other than the starting block of the picture may be zero, and the arrival time of the last bit in the encoded data of the starting block may be the same as the arrival time of the entire picture. In the case of the AVC standard, the video decoder would have to prepare for the worst case by holding off the decoding of the entire picture until the decode time of the picture arrives.

To solve the above problem, in the High Efficiency Video Coding (HEVC) disclosed in ISO/IEC DIS 23008-2, "Information technology—High efficiency coding and media delivery in heterogeneous environments—Part 2: High Efficiency Video Coding," 2012, which is the latest video coding standard currently under study by ITU-T and MPEG, a concept called the Decoding Unit (DU) has been introduced in addition to the Access Unit (AU) defined in the AVC standard. In video coding, an AU corresponds to one picture, and a DU has a plurality of network abstraction layers (NALs) including at least one slice NAL. In other words, a DU corresponds to a sub-picture having a plurality of blocks. In HEVC, the decode time of each DU is newly defined along with the decode time of the AU.

A video encoder conforming to the HEVC standard can reduce the delay in the video decoder by properly controlling the number of DUs in the picture, the number of blocks in each DU, and the amount of bits of each DU, and by describing the decode time of each DU within the encoded data. In the HEVC standard, the video encoder describes the number of DUs in the picture, the number of blocks in each DU, and the decode time (relative value) of each DU within the encoded data. These parameters are carried in a NumDecodingUnitsMinus1 field, a NumNalusInDuMinus1 field, and a DuCpbRemovalDelayMinus1 field, respectively, in a picture timing supplemental enhancement information (SEI) message.

Figure 4:
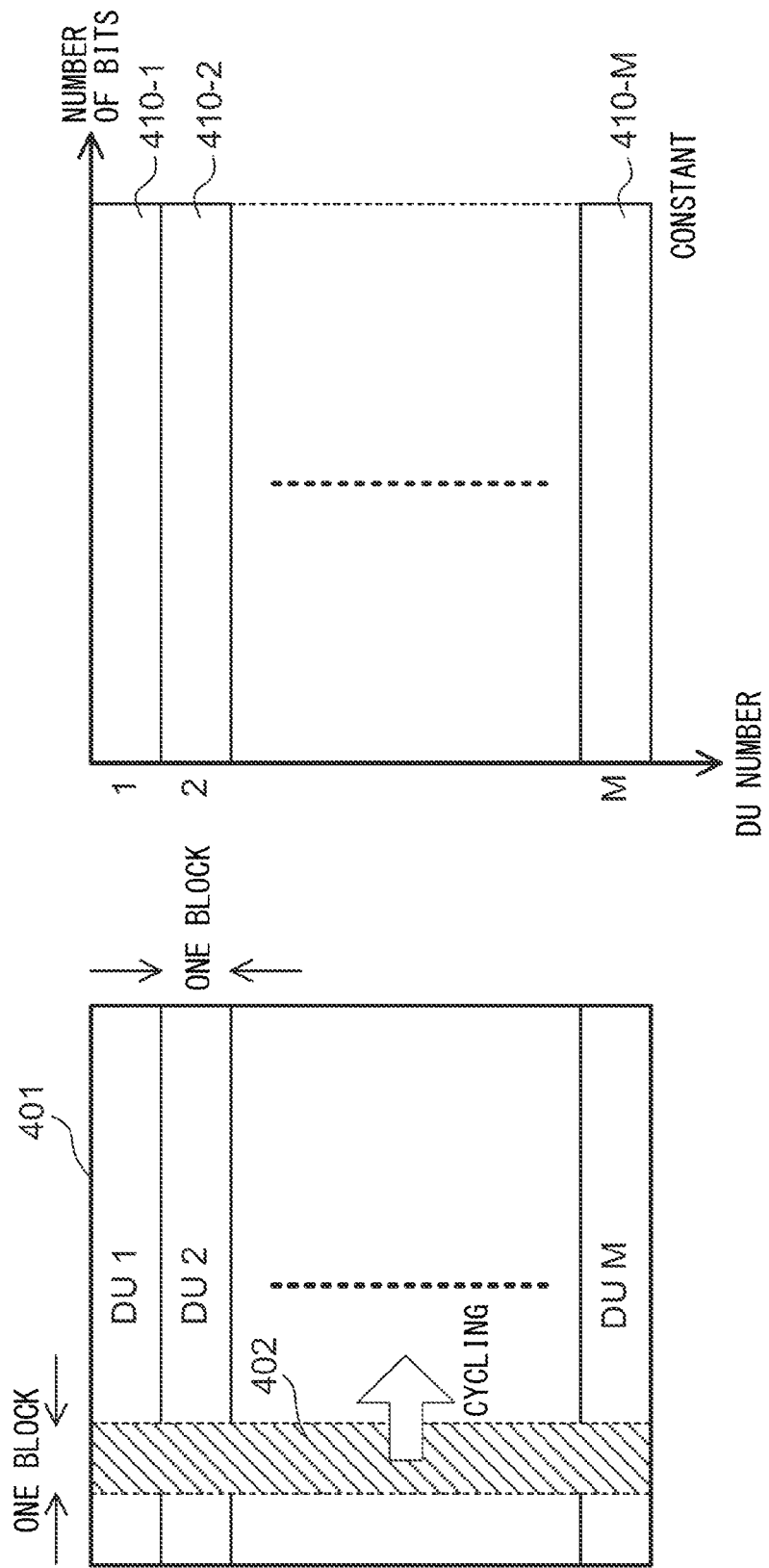
FIG. 4 is a diagram illustrating an example of encoding control performed in a video encoding unit to implement ultra-low delay video encoding.

FIG. 4 is a diagram illustrating, by way of example, one picture divided into DUs and the amount of bits allocated to each DU. In the illustrated example, each of the horizontal block lines constituting one picture 401 corresponds to a DU. When the number of lines in the picture 401 is denoted by ph, the number of pixels in each horizontal row in the picture 401 by pw, and the height and width of each block by bh and bw, respectively, the number M of DUs in one picture is given as (ph/bh). The number of blocks in each DU is given as (pw/bw).

Blocks 410-1 to 401-M represent the amount of encoded bits for the first to Mth DUs, respectively. The video encoder encodes each DU so that the amount of encoded bits, for example, becomes constant for all DUs. When the average value of the amount of encoded bits per picture is denoted by bp, the amount of encoded bits of each DU is given as (bp/M).

To make the amount of encoded bits constant for each DU, there is employed, for example, a method that intra-codes all the blocks. Alternatively, a method may be employed that inserts a vertically defined intra-coded block line in each picture and that cyclically moves the intra-coded block line in the horizontal direction for every predetermined number of pictures in a predetermined cycle. In either method, the video encoder needs to control the amount of bits properly because the amount of encoded bits varies from block to block, but the number of intra-coded blocks per block line can be made constant. As a result, compared with conventional intra-coding, it is easy to make the amount of encoded bits constant for each DU.

Figure 5:
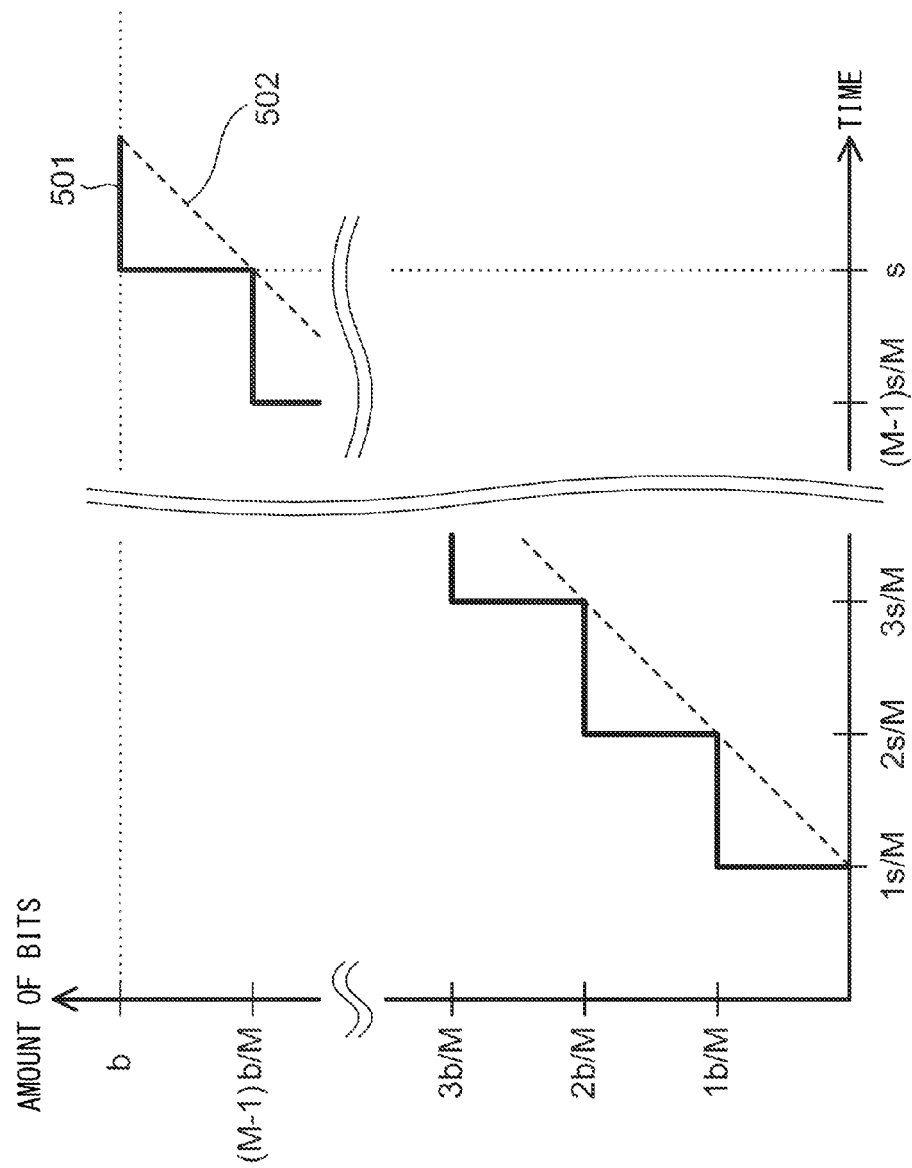
FIG. 5 is a diagram illustrating how the amount of generated bits accumulates as one picture is encoded in accordance with the encoding control of FIG. 4.

FIG. 5 is a diagram illustrating how the amount of generated encoded bits accumulates when one picture is encoded on a block line basis by the video encoder as depicted in FIG. 4. The abscissa represents the time, and the ordinate represents the amount of bits. With the encoding start time of the picture being at 0, the video encoder encodes the blocks in all the DUs in one picture time s. For example, the video encoder starts to encode the first DU at time 0, and completes the encoding of the first DU at time 1 s/M. The video encoder completes the encoding of the last DU (Mth DU) at time s.

Graph 501 depicts how the accumulated amount of generated bits varies with time. An amount of bits equal to (1 b/M) is generated at the end of the encoding of the first DU. Here, b represents the amount of generated information (target value) for the entire picture. After that, the amount of generated bits increases by (1 b/M) as the encoding of each DU is completed and, at time s, the accumulated amount of generated bits reaches b representing the amount of information generated for the picture.

Graph 502 depicts how the amount of transmitted bits accumulates when the encoded data is transmitted at a constant rate (b/s) starting at time (1 s/M). From a comparison between the graphs 501 and 502, it is seen that the graph 501 is always located above the graph 502. This means that underflow does not occur in the encoded picture buffer of the video encoder. Suppose that the video decoder starts decoding the first DU of the picture after the time (1 s/M) has elapsed from the arrival of the first bit of the picture, and then decodes all the DUs over one picture time. In this case, the encoded picture buffer of the video decoder does not underflow. In the AVC standard, etc., defined in ISO/IEC 14496-10, "Information technology—Coding of audio-visual objects—Part 10: Advanced Video Coding," 2010, the decode time of all the blocks in one picture is defined to be s; it therefore follows that the decoding start time defined for each DU is earlier by ((M−1)s/M) than the decoding start time defined in the AVC standard, etc.

The video encoder and decoder need not necessarily expend one full picture time to encode or decode one picture, but may complete the processing in a time shorter than one picture time. In this case, however, an idle time occurs between the end of the processing of one DU and the start of the processing of the next DU. The decoding start of each DU and its corresponding encoding start time need to match the earlier defined times. In the HEVC standard, the decoding start times (1 s/M), 2 s/M), . . . of the respective DUs are included in the encoded data to explicitly indicate the decoding start time of each DU to the video decoder.

If the number of encoded lines in the picture, rather than the amount of generated bits, is plotted along the ordinate in FIG. 5, it can be seen that the picture encoding start timing need not be shifted by s from the timing of the picture input to the video encoder. In the illustrated example, if the encoding start timing is just shifted from the picture input timing by (1 s/M), it is guaranteed that, by the time the processing of each DU is started, the necessary line has already been input to the video encoder. However, the above discussion generally does not hold true for the video decoder. The reason is due to the in-loop filtering applied across block line boundaries. The time at which the in-loop filtering is applied to the display data of any given block is later than the time at which the processing up to the point just before the in-loop filtering of the block adjacent downward of that given block is completed.

As defined in the HEVC standard disclosed in ISO/IEC DIS 23008-2, "Information technology—High efficiency coding and media delivery in heterogeneous environments—Part 2: High Efficiency Video Coding," 2012, the video encoder explicitly specifies the decode time of each DU (subpicture) in the picture (the decode time here corresponds to the DTS defined in the MPEG-2 Systems standard disclosed in ISO/IEC 13818-1, "Information technology—Generic coding of moving pictures and associated audio information: Systems," 2006). Further, by making the number of blocks and the amount of bits constant for each DU, the video encoder can reduce the codec delay in proportion to the number of DUs. However, since the decode time is not specified on a DU-by-DU basis in the MPEG-2 Systems standard defined in ISO/IEC 13818-1, "Information technology—Generic coding of moving pictures and associated audio information: Systems," 2006, it is not possible to achieve an ultra-low delay design at the level of the system that encodes not only video data but also other media data.

The embodiments disclosed in this specification achieve reductions in codec delay at the system level by extending the MPEG-2 Systems in the following manner.

(1) Extension of Video PES Packet Header

According to the MPEG-2 Systems standard defined in ISO/IEC 13818-1, "Information technology—Generic coding of moving pictures and associated audio information: Systems," 2006, the PTS (of the starting AU) of the contained AUs is described in the PES packet header. In the system of the present embodiment, the video encoder describes information indicating the DTS of each DU, in addition to the PTS of the AU. It is guaranteed that the encoded data are multiplexed so that the encoded data of each DU in the multiplexed data arrives at the video decoder at a time earlier than the time specified by the DTS of the DU.

The video encoder further describes information indicating a second PTS which is used when the decoding of each DU is started at the time specified by the DTS of the DU. This second PTS is earlier in time than the PTS of the AU. If the time needed for the video decoder to decode the DU is equal to or shorter than the DU time, the multiplexed video decoding apparatus starts to display the picture based on the second PTS so that the picture can be displayed without loss of decoded pixels (the loss of decoded pixels means that the display timing arrives before the decoding is complete). The information indicating the DTS of the DU and the information indicating the second PTS together correspond to second decode/display information.

In the system of the present embodiment, the reason for also carrying the PTS of the AU in the PES packet header is that conventional multiplexed video decoding apparatus is not always equipped with a video decoder capable of ultra-low delay operation. An example is the case of a video decoder having a plurality of decoding cores which perform decoding in concurrent fashion. Even if the per-block processing speed of each decoding core is one-Nth (N is the number of decoding cores) of the processing speed of the decoder that completes the processing of all the blocks of one picture in one picture time, each picture can be decoded without fail. This, however, increases the delay, i.e., the time to complete the decoding, and the decoding of the necessary pixels does not end before the arrival of the second PTS. To provide for such cases, the HEVC standard allows the video decoder to select the decoding start timing between AU-based timing and DU-based timing.

(2) Extension of Audio PES Packet Header

As in the case of the encoded video PES packet, the audio encoder in the multiplexed video encoding apparatus adds information indicating second PTS in the PES packet header in addition to the PTS corresponding to the first decode/display information of the AU (an audio frame in the case of audio). The second PTS is used to determine the decode time and display time of the AU when the multiplexed video decoding apparatus performs decoding based on the DTS of each DU in the video PES packet. It is guaranteed that the audio frames are also multiplexed so that each audio frame in the multiplexed data will arrive at the multiplexed video decoding apparatus by the time indicated by the corresponding second PTS.

Each picture contained in the video data may be either a frame or a field. A frame is one complete still image in the video data, while a field is a still image obtained by extracting data only in the odd-numbered lines or even-numbered lines from one frame. Further, each picture contained in the video data may be either a color video image or a monochrome video image.

The media data other than the video data may be audio data or may be media information such as subtitles having display time information. The audio data is encoded with a predetermined sampling pitch and frame length, and is assigned a display time on a frame-by-frame basis. The coding method used for encoding the audio data may be compression coding such as the MPEG-2 AAC defined in ISO/IEC 13818-7, "Information technology—Generic coding of moving pictures and associated audio information—Part 7: Advanced Audio Coding (AAC)," 2006, or may be PCM coding such as G.711 defined in ITU G.711, "Pulse code modulation (PCM) of voice frequencies," 1990.

The terms "ultra-low delay encoding", "ultra-low delay decoding", and "ultra-low delay multiplexing" used in this specification refer to encoding, decoding, and encoded data multiplexing, respectively, in which the picture codec delay is less than one picture time.

Figure 6:
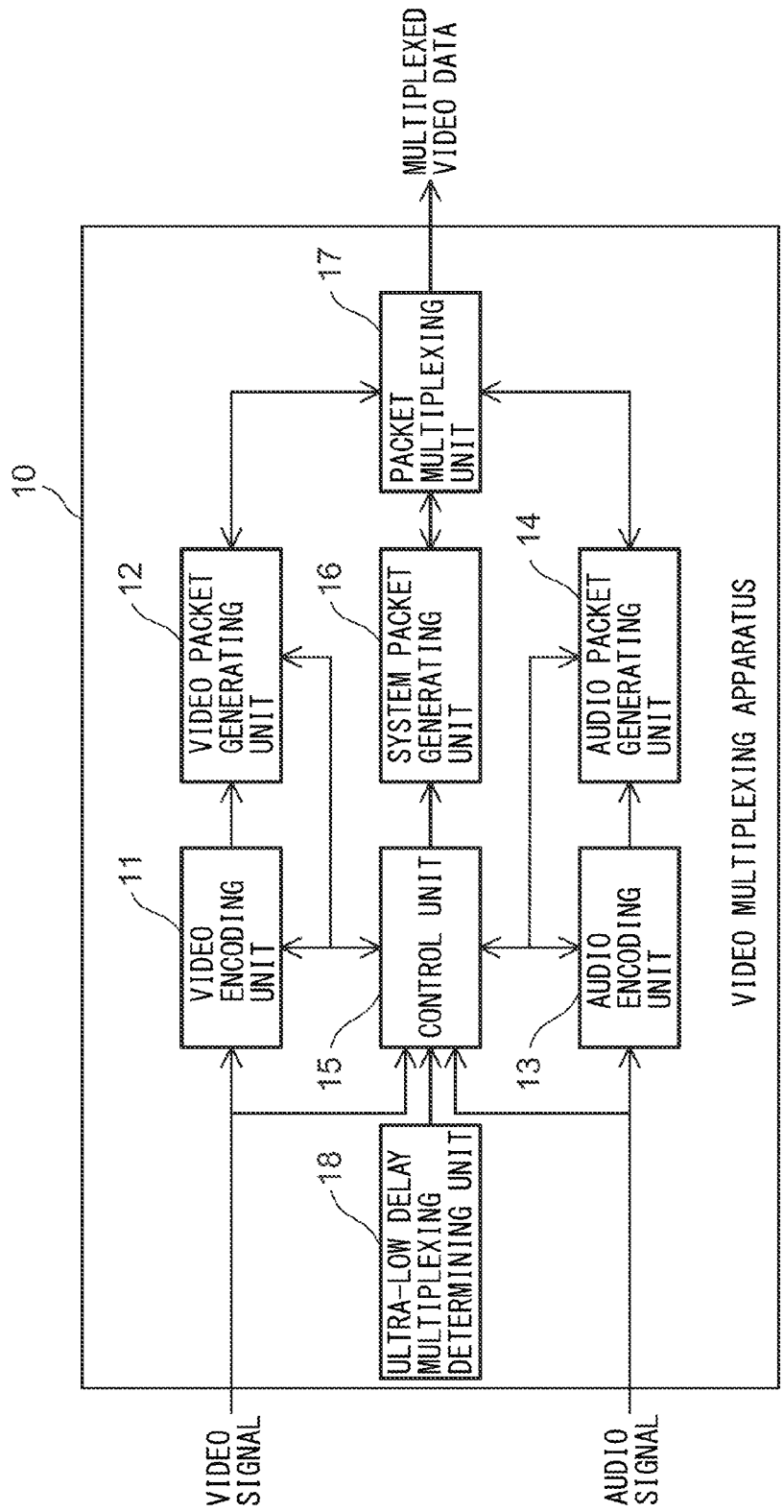
FIG. 6 is a diagram schematically illustrating the configuration of a video multiplexing apparatus according to a first embodiment.

FIG. 6 is a diagram schematically illustrating the configuration of the video multiplexing apparatus according to the first embodiment. The video multiplexing apparatus 10 includes a video encoding unit 11, a video packet generating unit 12, an audio encoding unit 13, an audio packet generating unit 14, a control unit 15, a system packet generating unit 16, a packet multiplexing unit 17, and an ultra-low delay multiplexing determining unit 18. These units constituting the video multiplexing apparatus 10 are each implemented as a separate circuit on the video multiplexing apparatus 10. Alternatively, these units constituting the video multiplexing apparatus 10 may be implemented on the video multiplexing apparatus 10 in the form of a single integrated circuit on which the circuits implementing the functions of the respective units are integrated. Further alternatively, these units constituting the video multiplexing apparatus 10 may be functional modules implemented by executing a computer program on a processor incorporated in the video multiplexing apparatus 10.

The video encoding unit 11 and the audio encoding unit 13 may both be omitted from the video multiplexing apparatus 10. In that case, the video data and the audio data are input to the video multiplexing apparatus 10 after being encoded by other apparatus. The V-sync time of each picture and the capture time of the first sample in each audio frame are supplied from such other apparatus used to encode the video data and the audio data, respectively.

The video encoding unit 11 encodes the input video data in accordance with the coding method specified by the control unit 15. The coding method specified may be, for example, one that conforms to the HEVC standard defined in ISO/IEC DIS 23008-2, "Information technology—High efficiency coding and media delivery in heterogeneous environments—Part 2: High Efficiency Video Coding," 2012, or one that conforms to the AVC standard defined in ISO/IEC 14496-10, "Information technology—Coding of audio-visual objects—Part 10: Advanced Video Coding," 2010. When the specified coding method is one that conforms to the HEVC standard, the video encoding unit 11 decides whether ultra-low delay encoding is to be applied or not, based on an ultra-low delay multiplexing control signal issued from the control unit 15.

If it is decided to apply ultra-low delay encoding to the video data, the video encoding unit 11 uses an encoding method that does not involve picture reordering, for example, an encoding method that uses only forward predictive coding in inter-coding. Then, the video encoding unit 11 encodes each picture in the video data by controlling the bit rate so that the amount of bits becomes constant for all the pictures in the video data. Further, the video encoding unit 11 divides each picture into a plurality of DUs, and encodes each picture so that the number of blocks contained in each DU and the amount of bits of each DU become constant across the picture. Then, the video encoding unit 11 notifies the control unit 15 of the decode time of each DU and the display time thereof at the time of ultra-low delay operation.

On the other hand, if it is decided not to apply ultra-low delay encoding to the video data, the video encoding unit 11 may use a method that involves picture reordering, for example, a method that performs bidirectional predictive coding in inter-coding. In this case, the amount of encoded bits need not be made constant for each picture. Further, the video encoding unit 11 need not divide each picture into a plurality of DUs; if the picture is divided into a plurality of DUs, the number of blocks contained in each DU and the amount of bits of each DU need not be made constant across the picture.

The video encoding unit 11 passes the encoded video data to the video packet generating unit 12.

The video packet generating unit 12 that received the encoded video data from the video encoding unit 11 packetizes the video data into PES packets on a picture-by-picture basis. The video packet generating unit 12 further packetizes the PES packets of the encoded video data into TS packets, and passes the TS packets to the packet multiplexing unit 17. In this case, the video packet generating unit 12 generates the TS packets by including therein information concerning the decode time and display time to be used when the video decoder decodes the picture in accordance with the existing coding standard such as AVC and information concerning the decode time and display time to be used when decoding the picture by ultra-low delay decoding. The PES packetization will be described in detail later.

The audio encoding unit 13 encodes the input audio data in accordance with the coding method specified by the control unit 15. The coding method specified may be, for example, one that conforms to the MPEG-2 AAC standard defined in ISO/IEC 13818-7, "Information technology—Generic coding of moving pictures and associated audio information—Part 7: Advanced Audio Coding (AAC)," 2006, or one that conforms to the G.711 standard defined in ITU G.711, "Pulse code modulation (PCM) of voice frequencies," 1990, or some other suitable audio coding standard. When the ultra-low delay multiplexing control signal issued from the control unit 15 to the video encoding unit 11 indicates ultra-low delay encoding, the control unit 15 also directs the audio encoding unit 13 to use a low-delay coding method. In particular, when it is desired to hold the delay from input to reproduction per frame to within about 10 milliseconds, the control unit 15 directs the audio encoding unit 13 to use, for example, a method that conforms to the G.711 standard. The audio encoding unit 13 passes the encoded audio data to the audio packet generating unit 14.

The audio packet generating unit 14 that received the encoded audio data from the audio encoding unit 13 packetizes the audio data into PES packets on a frame-by-frame basis. The audio packet generating unit 14 further packetizes the PES packets of the encoded audio data into TS packets. In this case, the audio packet generating unit 14 generates the TS packets by including therein information concerning the decode time and display time to be used when the audio decoder decodes the frame in accordance with the existing coding standard such as AVC and information concerning the decode time and display time to be used when decoding the audio frame by ultra-low delay decoding. After that, the audio packet generating unit 14 passes the TS packets to the packet multiplexing unit 17.

The ultra-low delay multiplexing determining unit 18 determines whether ultra-low delay multiplexing is to be performed or not, based on an externally supplied ultra-low delay multiplexing control signal (not depicted) and on information indicating whether or not the video encoding unit 11 is capable of ultra-low delay encoding, and passes the result of the determination to the control unit 15. If the ultra-low delay multiplexing control signal directs that "ultra-low delay multiplexing be performed", and if the video encoding unit 11 is capable of ultra-low delay encoding, then the ultra-low delay multiplexing determining unit 18 determines that ultra-low delay multiplexing is to be performed. Otherwise, the ultra-low delay multiplexing determining unit 18 determines that ultra-low delay multiplexing is not to be performed.

The control unit 15 has a 27-MHz STC which provides the reference clock for synchronization control. In accordance with the ultra-low delay encoding control signal received from the ultra-low delay multiplexing determining unit 18, the control unit 15 signals the video coding method and the audio coding method to be used to the video encoding unit 11 and the audio encoding unit 13, respectively.

The control unit 15 sends the ultra-low delay encoding control signal to the video encoding unit 11, the video packet generating unit 12, the audio encoding unit 13, the audio packet generating unit 14, and the system packet generating unit 16. When the ultra-low delay encoding control signal directing that "ultra-low delay encoding be applied" is sent to the video encoding unit 11, the control unit 15 calculates the decode time of each DU in the picture and the display time (second display time) to be used at the time of ultra-low delay encoding, and passes them to the video packet generating unit 12. The decode time and display time of each DU will be described later.

Further, the control unit 15 determines the display time (first display time) of each picture by taking the STC value at the vertical synchronization signal V-Sync timing of the input video data, and sends it to the video packet generating unit 12 along with the ultra-low delay encoding control signal. In this case, the control unit 15 further sends the first display time and second display time of the picture, and the STC value taken at the first sample timing of the audio frame in the input audio data, to the audio packet generating unit 14 along with the ultra-low delay encoding control signal.

The system packet generating unit 16 generates system TS packets which store program specific information (PSI) as system information. The details of the system TS packets will be described later.

The packet multiplexing unit 17 generates a TS stream by multiplexing together the video TS packets output from the video packet generating unit 12, the audio TS packets output from the audio packet generating unit 14, and the system TS packets output from the system packet generating unit 16. The packet multiplexing unit 17 outputs the TS stream. The packet multiplexing unit 17 multiplexes the packets so as to conform to the STD (System Target Decoder) specification defined in the MPEG-2 Systems standard. When the ultra-low delay encoding control signal directing that "ultra-low delay encoding be applied" is received from the control unit 15, the packet multiplexing unit 17 multiplexes the video TS packets so that the STC value of the multiplexed video decoding apparatus will come earlier in time than the DTS of the picture contained in the payload. The DTS of the picture contained in the payload is carried, for example, in the video PES packet header.

Further, when the ultra-low delay encoding control signal directing that "ultra-low delay encoding be applied" is received from the control unit 15, the packet multiplexing unit 17 multiplexes the audio TS packets so that the STC value of the multiplexed video decoding apparatus will come earlier in time than the second PTS of the audio frame contained in the payload. The second PTS of the audio frame contained in the payload is carried, for example, in the audio PES packet header.

By thus performing the multiplexing, when the decoding unit of the video data is a sub-picture (DU) the packet multiplexing unit 17 can ensure that, for each picture, the encoded data corresponding to the first sub-picture in the picture and the corresponding encoded data of the audio frame will arrive at the multiplexed video decoding apparatus at a time that is earlier than or the same as the decode time of the picture for ultra-low delay decoding.

The data structures of the system TS packet, video PES packet, and audio PES packet according to the first embodiment will be described below.

Figure 7:
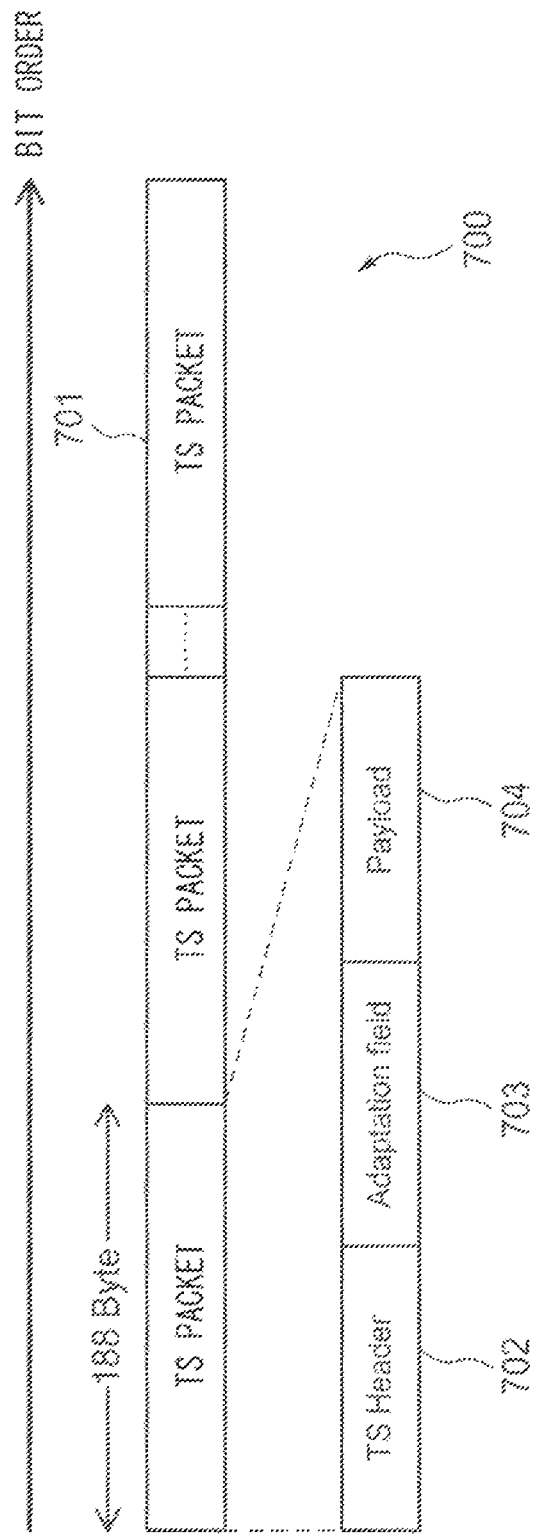
FIG. 7 is a diagram schematically illustrating the structure of a TS packet header according to the first embodiment.

First, the data structure of a conventional TS packet will be described with reference to FIG. 7. A TS stream 700 contains a plurality of successive TS packets 701. Each TS packet 701 has a fixed length. In the present embodiment, each TS packet 701 is 188 bytes long.

The TS packet 701 contains a TS header 702, an adaptation field 703, and a payload 704 in this order from the head thereof.

The TS header 702 contains a plurality of fields such as an AdaptationFieldControl field and a PID field. The values and meanings of these fields are the same as those defined in the MPEG-2 Systems standard disclosed in ISO/IEC 13818-1, "Information technology—Generic coding of moving pictures and associated audio information: Systems," 2006.

The adaptation field 703 is present when the value of the AdaptationFieldControl field carried in the TS header 702 is "10" or "11". The adaptation field 703 also carries a plurality of fields conforming to the MPEG-2 Systems standard.

The payload 704 is present when the value of the AdaptationFieldControl field carried in the TS header 702 is "01" or "11". If the value of the PID field in the TS header 702 indicates a video PES packet, the TS packet 701 is a video TS packet, and data into which the video PES packet is split is stored in the payload 704. On the other hand, if the value of the PID field in the TS header 702 indicates an audio PES packet, the TS packet 701 is an audio TS packet, and data into which the audio PES packet is split is stored in the payload 704.

If the value of the PID field in the TS header 702 is "0x0" or is the value of ProgramMapID to be described later, the TS packet 701 is a system TS packet. In this case, a program association table (PAT) or a program map table (PMT) is stored in the payload 704.

Next, the data structure of the system TS packet according to the first embodiment will be described with reference to FIG. 8.

The system TS packet 801 according to the first embodiment is a TS packet that carries a program association table (PAT) in its payload. Like the TS packet depicted in FIG. 7, the system TS packet 801 also contains a TS header 802, an adaptation field 803, and a payload 804 in this order from the head thereof. In this case, the value of the PID field in the TS packet header 802 is set to "0".

The payload 804 carries the various fields of the PAT that are defined in the MPEG-2 Systems standard. In the present embodiment, the value of the TableID field is set to "0". ProgramMapID conveys the PID of the system TS packet containing the program map table (PMT) that describes the structure of each individual program. In the illustrated example, the value of ProgramMapID is set to "0xA".

On the other hand, the TS packet 811 is a TS packet that carries PMT in its payload. The TS packet 811 also contains a TS header 812, an adaptation field 813, and a payload 814 in this order from the head thereof. In this case, the value of the PID field in the TS packet header 812 is set to "0xA".

The payload 814 carries the various fields of the PMT that are defined in the MPEG-2 Systems standard. In the illustrated example, the value of the TableID field is set to "0x2".

StreamType conveys the type of each elementary stream. For example, StreamType is set to "0x1B", "0x0F", and "0x24", respectively, to indicate the type of elementary stream conforming to the AVC standard defined in ISO/IEC 14496-10, "Information technology—Coding of audio-visual objects—Part 10: Advanced Video Coding," 2010, the type of elementary stream conforming to the MPEG-2 AAC standard defined in ISO/IEC 13818-7, "Information technology—Generic coding of moving pictures and associated audio information—Part 7: Advanced Audio Coding (AAC)," 2006, and the type of elementary stream conforming to the HEVC standard defined in ISO/IEC DIS 23008-2, "Information technology—High efficiency coding and media delivery in heterogeneous environments—Part 2: High Efficiency Video Coding," 2012, respectively.

ElementaryPID carries the PID of the TS packet that stores each elementary stream.

Descriptor that follows ESInfoLength contains a plurality of fields defined for each elementary stream type. The number of Descriptors depends on ESInfoLength. The details will be described later.

Figure 9:
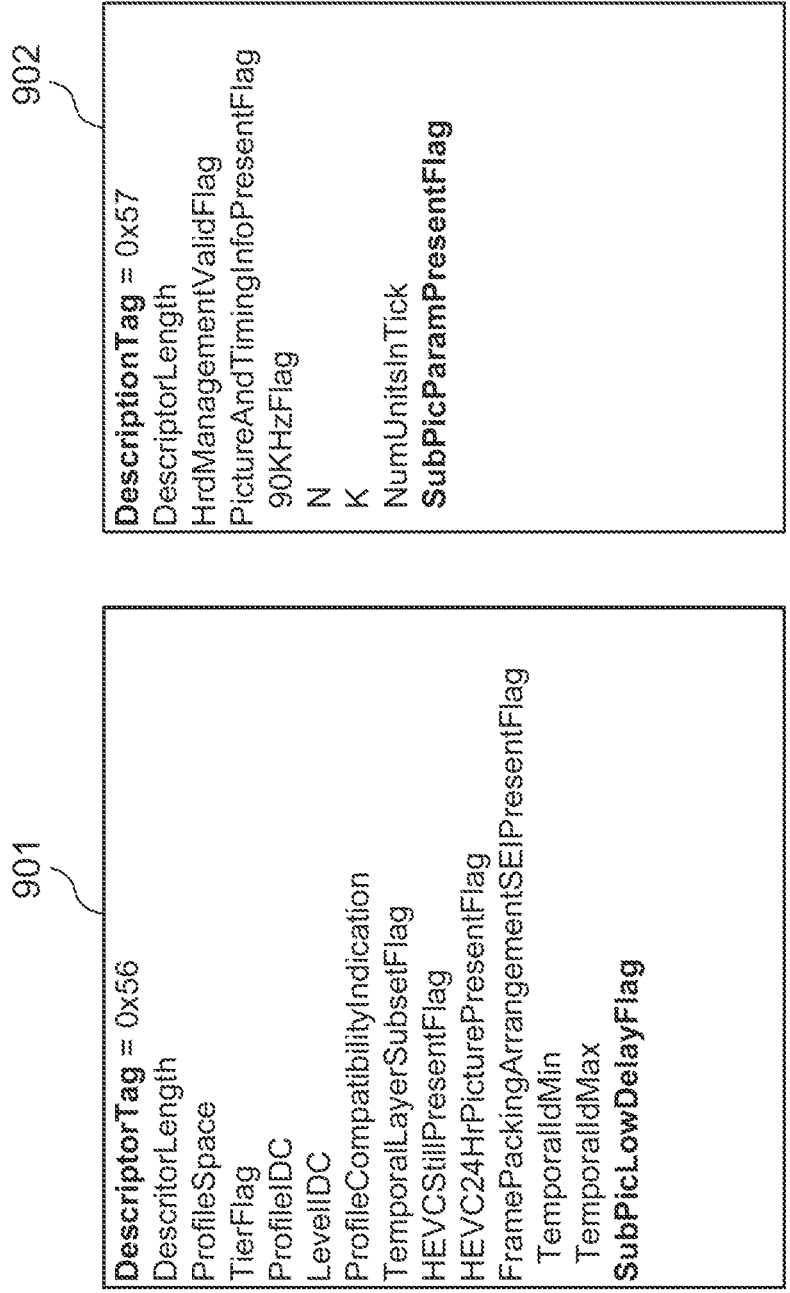
FIG. 9 is a diagram schematically illustrating the structure of Descriptor according to the first embodiment.

The structure of the Descriptor field according to the first embodiment will be described with reference to FIG. 9 for the case where the elementary stream conforms to the HEVC standard.

Descriptors 901 are HEVC video descriptors. The fields located above the flag SubPicLowDelayFlag each correspond to the field of the same descriptor name in the HEVC standard defined in ISO/IEC 13818-1: 2013/PDAM3, "Transport of HEVC Video over MPEG-2 Systems," 2012.

In the present embodiment, the flag SubPicLowDelayFlag is included in addition to the above fields. The flag SubPicLowDelayFlag is a flag that indicates whether ultra-low delay encoding is to be applied or not. In the present embodiment, when the flag SubPicLowDelayFlag is "0", the video multiplexing apparatus 10 applies ultra-low delay encoding to the video data. When the flag SubPicLowDelayFlag is "0", the video PES contains both the first PTS and second PTS information (details will be described later), and other elementary stream PESs also contain both the first PTS and second PTS information.

On the other hand, when the flag SubPicLowDelayFlag is "1", the video multiplexing apparatus 10 does not apply ultra-low delay encoding to the video data. In this case, the video PES may contain both the first PTS and second PTS information, but other elementary stream PESs do not contain the second PTS information. In other words, when the flag SubPicLowDelayFlag is set to "1", the flag indicates that elementary streams other than video are not multiplexed so as to be capable of ultra-low delay encoding.

The reason that the flag SubPicLowDelayFlag is set to "0" to indicate that ultra-low delay encoding has been done is to maintain compatibility with the existing standards. This serves to prevent degradation of the coding efficiency, because one of reserved bits whose value is specified to be "1" in the existing standards can be used as the SubPicLowDelayFlag field.

Descriptors 902 are HEVC timing and HRD descriptors. The fields depicted above the flag SubPicParamPresentFlag each correspond to the field of the same descriptor name in the HEVC standard defined in ISO/IEC 13818-1: 2013/PDAM3, "Transport of HEVC Video over MPEG-2 Systems," 2012.

In the present embodiment, the flag SubPicParamPresentFlag is included in addition to the above fields. SubPicParamPresentFlag is a flag that indicates whether ultra-low delay encoding is to be applied or not. In the present embodiment, when applying ultra-low delay encoding, the flag SubPicParamPresentFlag is set to a value complementary to the value of SubPicParamPresentFlag contained in Video Usability Information (VUI) carried in the HEVC elementary stream. In other words, when the flag SubPicLowDelayFlag is "1", the flag SubPicParamPresentFlag is invariably "0".

Next, the structure of an elementary stream PES packet, including video PES packet and audio PES packet, will be described with reference to FIG. 10. The list 1000 provides a list of fields contained in a PES packet. The PES packet according to the first embodiment contains SecondPTSDelta and AdditionalDTSDelta as the second decode/display information in addition to the various fields of the PES packet defined in the MPEG-2 Systems standard.

In the present embodiment, when ultra-low delay encoding is performed, i.e., when SubPicLowDelayFlag in the Descriptor of the TS packet is "0", picture reordering is not performed. As a result, PTSDTSFlag is always set to a two-bit value "10" which indicates that DTS is not specified.

PTS stores the first PTS value, which is the PTS value when ultra-low delay encoding is not performed.

DTS is not present when PTSDTSFlag is "10".

PESExtensionFlag, which is a flag indicating that PES is extended, is set to "1" when the fields from PESPrivateDataFlag to the field just before StuffByte are present. In the present embodiment, when SubPicLowDelayFlag in the HEVC Descriptor of the TS packet is "0", i.e., when ultra-low delay encoding is performed, PESExtensionFlag is always set to "1". Further, when SubPicLowDelayFlag is "0", i.e., when ultra-low delay encoding is performed, StreamIdExtension is always set to "1". Likewise, when SubPicLowDelayFlag is "0", i.e., when ultra-low delay encoding is performed, TREFExtensionFlag is always set to "0".

AlternativePTSDTSFlag is a flag that indicates whether ultra-low delay encoding is performed or not. When SubPicLowDelayFlag in the HEVC Descriptor is "0", i.e., when ultra-low delay encoding is performed, AlternativePTSDTSFlag is always set to "0". AlternativePTSDTSFlag being "0" indicates that SecondPTSDelta and AdditionalDTSDelta as the second decode/display information are contained in the PES packet.

SecondPTSDelta is a parameter for calculating PTS that the multiplexed data decoding apparatus uses when performing ultra-low delay decoding. SecondPTSDelta is present when SubPicLowDelayFlag is "0". How this parameter is derived and used will be described later.

AdditionalDTSDelta is a parameter for calculating DTS that the multiplexed data decoding apparatus uses when performing ultra-low delay decoding. AdditionalDTSDelta is present when SubPicLowDelayFlag is "0". How this parameter is derived and used will be described later.

PESPacketDataByte stores one AU data.

Next, a description will be given of the method of generating the decoding/display time information to be carried in the video PES packet and audio PES packet when applying ultra-low delay encoding to the video data. The method of generating the decoding/display time information to be carried in the video PES packet and audio PES packet when not applying ultra-low delay encoding to the video data is the same as that defined, for example, in the HEVC standard.

First, the control unit 15 determines the first PTS of the video PES by taking the internal STC value corresponding to the V-Sync timing of the picture to be processed. Since the resolution of STC is 27 MHz, and the resolution of PTS is 90 kHz, the control unit 15 calculates the first PTS by dividing the STC value by 300.

Next, the control unit 15 calculates the decoding start time offset DeltaDTS for the first DU in the picture and the display start time offset DeltaPTS for the picture. These values are expressed in units of 27 MHz. When the video encoding unit 11 determines the structure of each DU in the picture and the amount of encoded bits allocated to each DU, as depicted in FIG. 4, the control unit 15 calculates DeltaDTS and DeltaPTS as $(M-1)s/M$ and $(M-3)s/M$, respectively. M represents the number of DUs contained in the picture, and s denotes one picture time. The reason that DeltaDTS is not $(M-2)s/M$ but $(M-3)s/M$ is that in-loop filtering as defined in the HEVC standard is applied across DU boundaries. As a result, if the current block line being decoded is to be displayed, the processing up to the point just before the in-loop filtering of the block line adjacent downward of the current block line needs to be completed by that time.

The values of DeltaDTS and DeltaPTS are determined before the video encoding unit 11 completes the encoding of the first picture, and the values of DeltaDTS and DeltaPTS remain unchanged for the subsequent pictures. In other words, while holding the DU structure unchanged for each picture, the video encoding unit 11 controls the amount of encoded bits for each DU so that the accumulated amount of DU encoded bits does not become smaller than the accumulated amount of transmitted bits for any picture. The video encoding unit 11 may set DeltaDTS and DeltaPTS smaller by the same value by considering the variation of the amount of encoded bits from picture to picture and from DU to DU. Setting DeltaDTS smaller corresponds to shifting the graph 502 in FIG. 5 horizontally to the right.

Next, the control unit 15 determines the first PTS of the audio PES by taking the internal STC value corresponding to the input timing of the first sample in the audio frame to be processed. Then, the control unit 15 sets SecondPTSDelta and AdditionalDTSDelta of the video PES packet as DeltaPTS and DeltaDTS, respectively. Further, the control unit 15 sets SecondPTSDelta of the audio PES packet as DeltaPTS and AdditionalDTSDelta as one audio frame time.

Figure 11:
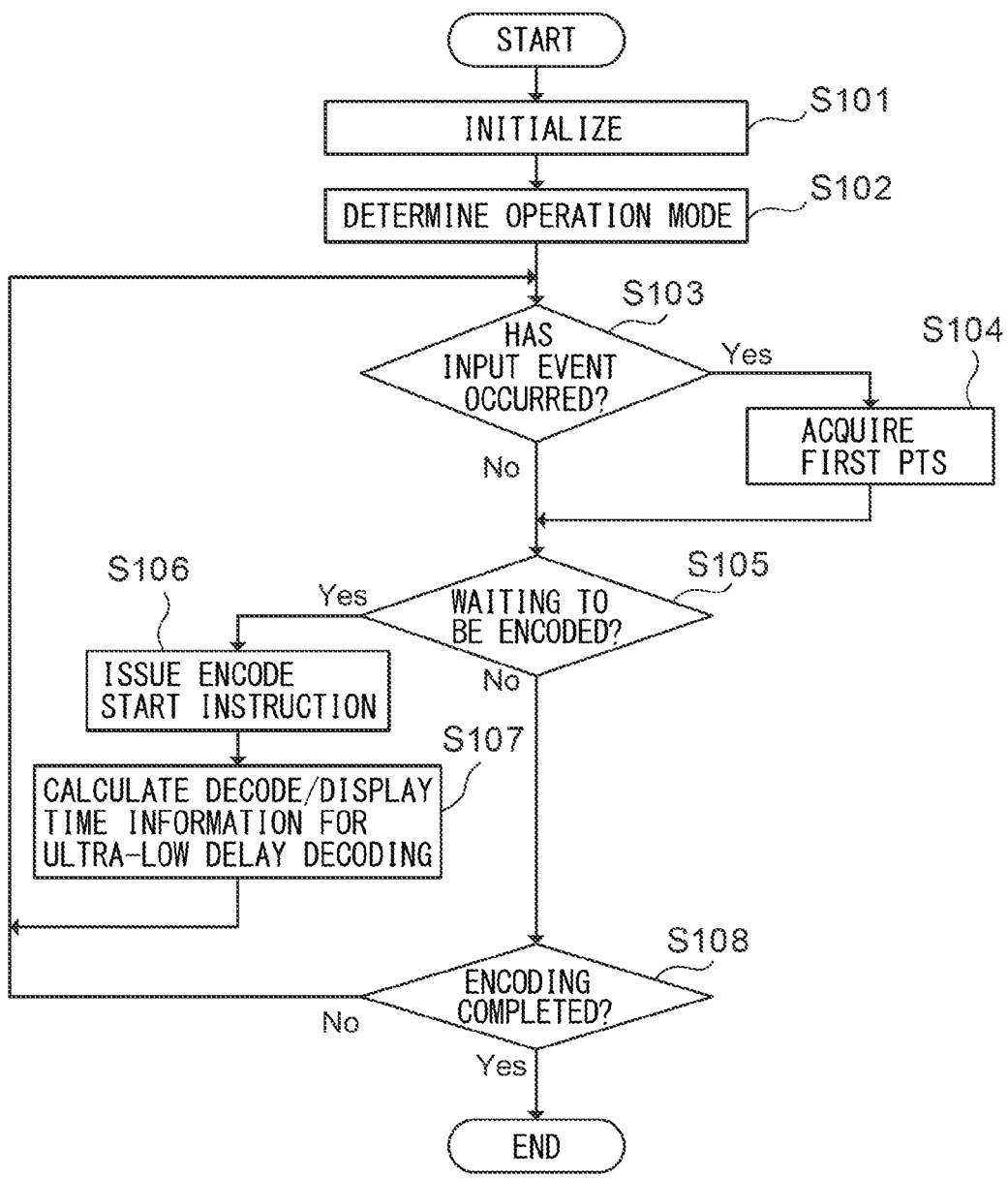
FIG. 11 is a process flow of a control unit according to the first embodiment.

The process flow of the video multiplexing apparatus according to the first embodiment will be described with reference to FIGS. 11 and 12. FIG. 11 illustrates the process flow of the control unit 15.

Before starting the video multiplexing process, the control unit resets the STC value to a predetermined value (for example, 0), and starts to count up STC (step S101). Further, the control unit 15 instructs the packet multiplexing unit 17 to start multiplexing.

Next, the control unit 15 determines the operation mode (step S102). Based on the externally supplied ultra-low delay encoding control signal, the control unit 15 determines whether or not to apply ultra-low delay encoding to the video and audio data. Then, the control unit 15 notifies the video encoding unit 11, the video packet generating unit 12, the audio encoding unit 13, the audio packet generating unit 14, and the system packet generating unit 16 as to whether ultra-low delay encoding is to be applied or not, and causes each unit to determine the operation mode accordingly. Further, the control unit 15 instructs the system packet generating unit 16 to start to generate the system TS packets at predetermined intervals of time.

Next, the control unit 15 checks whether the V-sync of the video data or the first sample of one audio frame in the audio data has been input or not (step S103). If the V-sync or the first sample has been input (Yes in step S103), the control unit 5 determines the first PTS by taking the STC value at the instant the start of the encoding unit was input (step S104). More specifically, if the V-sync of the input video data has been input, the control unit 15 takes the STC value at the instant of the input as the first PTS of the picture corresponding to the V-sync. The control unit 15 puts the picture in an encoding wait state, and sets the encoding start time of the picture so that the encoding of the picture will be started when a predetermined time (1 s/M in FIG. 5) has elapsed from the above time instant.

On the other hand, if the first sample of one audio frame in the audio data has been input, the control unit 15 takes the STC value at the instant of the input as the first PTS of the audio frame. The control unit 15 puts the audio frame in an encoding wait state, and sets the encoding start time of the audio frame so that the encoding of the audio frame will be started when a predetermined time (one audio frame time) has elapsed from the above time instant.

The control unit 15 checks these inputs in parallel. When the input of the V-sync and the input of the first sample of one audio frame have occurred at the same time, the control unit 15 sets the same PTS value for both the video data and the audio data.

After step S104, or after it is determined in step S103 that neither the V-sync nor the first sample has been input (No in step S103), the control unit 15 checks whether there is any picture or audio frame waiting to be encoded and whether their encoding start time matches the STC value or has arrived (step S105). If the condition in step S105 is satisfied (Yes in step S105), the control unit 15 instructs the video encoding unit 11 or the audio encoding unit 13 to start encoding the picture or the audio frame, respectively (step S106). Further, when ultra-low delay encoding is to be applied to the picture and audio frame, the control unit 15 obtains the decode/display time information for ultra-low delay decoding of the picture and audio frame, based on the amount of encoded bits per DU reported from the video encoding unit 11 (step S107). The control unit 15 sends the picture decode/display time information or the audio frame decode/display time information to the video packet generating unit 12 or the audio packet generating unit 14, respectively. The first PTS in the picture decode/display time information or the first PTS in the audio frame decode/display time information is determined based on the STC value acquired in step S104. After step S107, the control unit 15 returns to step S103 to repeat the above process.

If the condition in step S105 is not satisfied (No in step S105), the control unit 15 determines whether the encoding of the video and audio data has been completed or not (step S108). More specifically, the control unit 15 checks whether an external control signal for terminating the multiplexing process has been input and whether there is any picture or audio frame yet to be encoded. If the external control signal for terminating the multiplexing process has been input, or if there is no longer any picture or audio frame remaining to be encoded, the control unit 15 determines that the encoding has been completed. Then, the control unit 15 terminates the multiplexing process.

On the other hand, if the external control signal for terminating the multiplexing process has not been input yet, and if there remains any picture or audio frame to be encoded (No in step S108), the control unit 15 returns to step S103 to repeat the above process.

Figure 12:
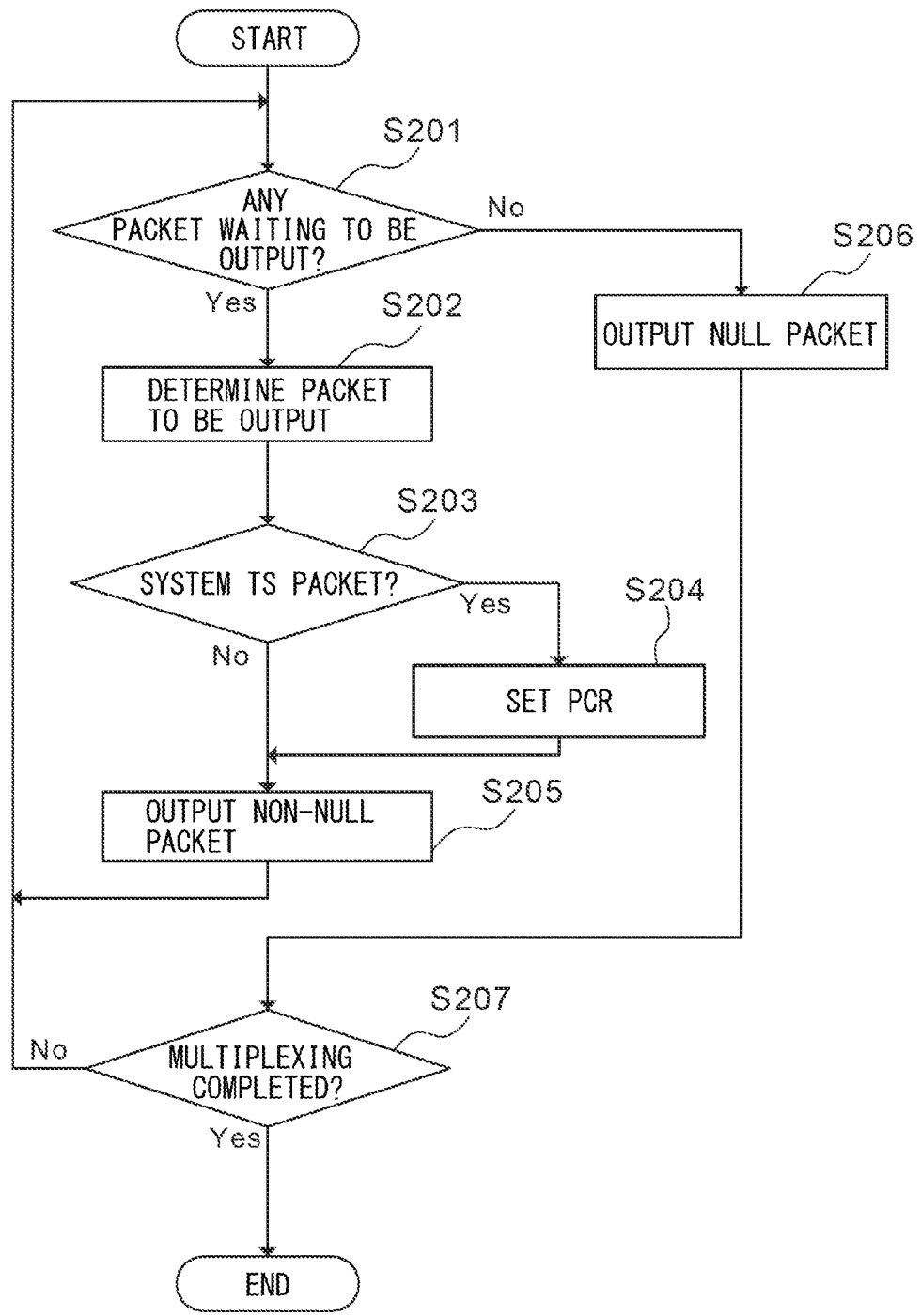
FIG. 12 is a process flow of a packet multiplexing unit according to the first embodiment.

FIG. 12 illustrates the process flow of the packet multiplexing unit 17. The packet multiplexing unit 17 checks whether there is any TS packet waiting to be output (step S201). The TS packet waiting to be output here refers to a video TS packet that has been generated by the video packet generating unit 12 but that has not yet been output from the packet multiplexing unit 17, an audio TS packet that has been generated by the audio packet generating unit 14 but that has not yet been output from the packet multiplexing unit 17, or a system TS packet that has been generated by the system packet generating unit 16 but that has not yet been output from the packet multiplexing unit 17.

If there is any TS packet waiting to be output (Yes in step S201), the packet multiplexing unit 17 determines the TS packet to be output next among the three kinds of TS packets, i.e., the video TS packet, the audio TS packet, and the system TS packet (step S202). If only one kind of TS packet is ready to be output, the packet multiplexing unit 17 selects that one kind of TS packet. If a plurality of kinds of TS packets are ready to be output, the packet multiplexing unit 17 selects one kind of TS packet so that every kind of TS packet is output evenly. As a method of selecting the kind of TS packet to be output, the packet multiplexing unit 17 may employ a weighted cyclic method in which if, for example, a number, n1, of video TS packets have been output in succession, next a number, n2, of audio packets are output in succession, followed by a number, n3, of system TS packets in succession. The weights n1, n2, and n3 are determined based, for example, on the frequencies of transmission of the video, audio, and system TS packets, respectively. The present embodiment is based on the assumption that the bit rate of the entire system is larger than the combined bit rate of the encoded video and encoded audio data.

The packet multiplexing unit 17 determines whether the TS packet to be output next is a system TS packet or not (step S203). If the TS packet to be output next is a system TS packet (Yes in step S203), the packet multiplexing unit 17 sets a PCR value in the adaptation field of the TS packet (step S204). The PCR value here is calculated by subtracting a prescribed value from the STC value taken at the instant that the byte at a specific byte position in the field carrying the PCR is output from the packet multiplexing unit 17. The prescribed value is, for example, a value corresponding to OffsetSTC in FIG. 15 to be described later.

After step S204, or after it is determined in step S203 that the TS packet to be output next is not a system TS packet (No in step S203), the packet multiplexing unit 17 outputs one TS packet of the selected kind (step S205). After that, the packet multiplexing unit 17 returns to step S201 to repeat the above process.

On the other hand, if there is no TS packet in step S201 to be output next (No in step S201), the packet multiplexing unit 17 outputs a NULL packet (step S206). A NULL packet is a packet whose PID is set to "0x1FFF". NULL packets are used for such purposes as maintaining the bit rate of the multiplexed stream at a constant value.

After step S206, the packet multiplexing unit 17 determines whether the multiplexing of the encoded video data and encoded audio data has been completed or not (step S207). If a multiplexing terminate instruction is received from the control unit 15, and if there is no longer any packet waiting to be output, the packet multiplexing unit 17 determines that the multiplexing of the encoded video data and encoded audio data has been completed. If the multiplexing has not yet been completed (No in step S207), the packet multiplexing unit 17 returns to step S201 to repeat the above process. On the other hand, if the multiplexing has been completed (Yes in step S207), the packet multiplexing unit 17 terminates the multiplexing process.

Next, the multiplexed video decoding apparatus for decoding the video data multiplexed by the video multiplexing apparatus 10 will be described.

Figure 13:
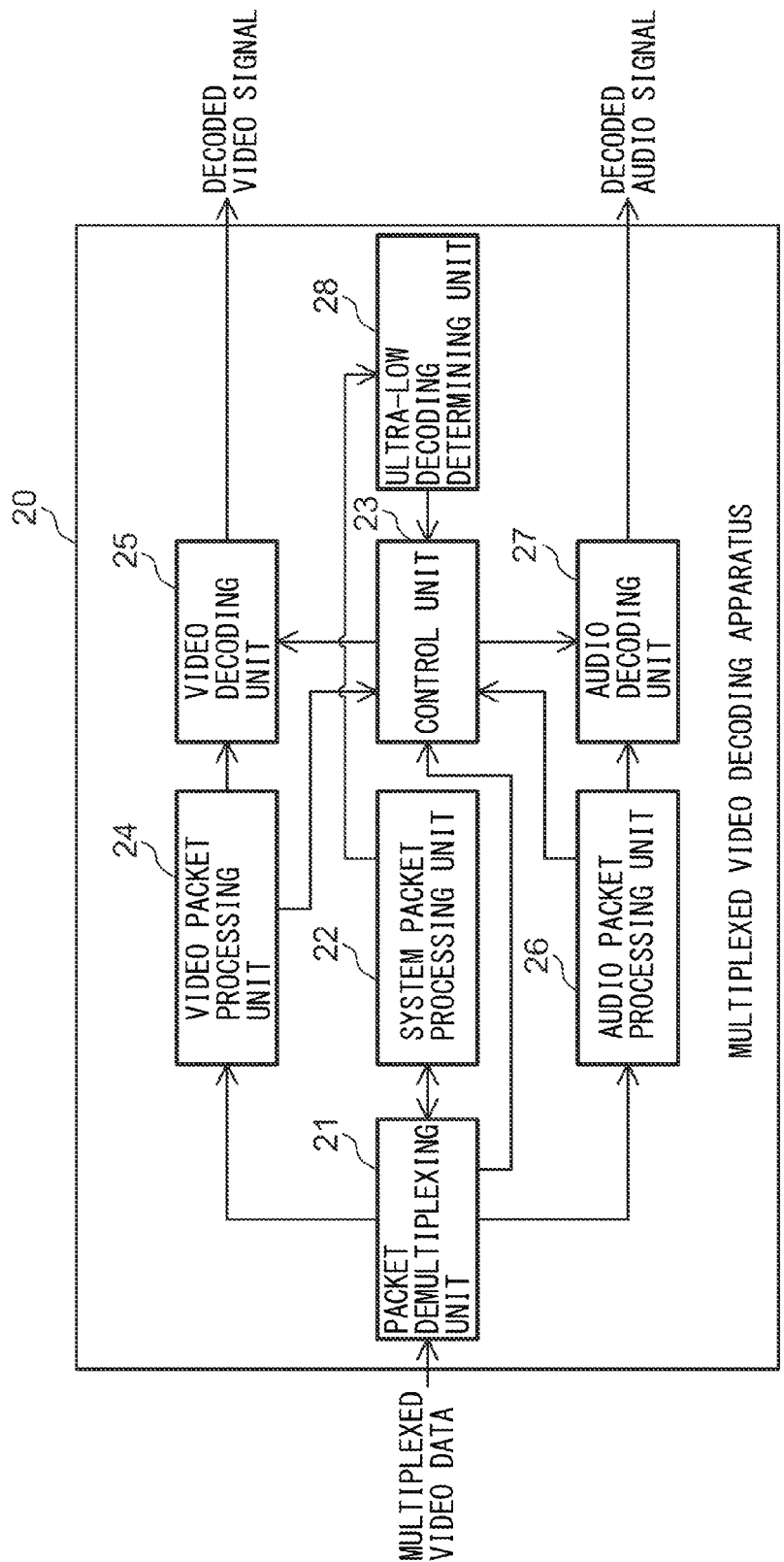
FIG. 13 is a diagram schematically illustrating the configuration of a multiplexed video decoding apparatus according to the first embodiment.

FIG. 13 is a diagram schematically illustrating the configuration of the multiplexed video decoding apparatus according to the first embodiment. The multiplexed video decoding apparatus 20 includes a packet demultiplexing unit 21, a system packet processing unit 22, a control unit 23, a video packet processing unit 24, a video decoding unit 25, an audio packet processing unit 26, an audio decoding unit 27, and an ultra-low delay decoding determining unit 28. These units constituting the multiplexed video decoding apparatus 20 are each implemented as a separate circuit on the multiplexed video decoding apparatus 20. Alternatively, these units constituting the multiplexed video decoding apparatus 20 may be implemented on the multiplexed video decoding apparatus 20 in the form of a single integrated circuit on which the circuits implementing the functions of the respective units are integrated. Further alternatively, these units constituting the multiplexed video decoding apparatus 20 may be functional modules implemented by executing a computer program on a processor incorporated in the multiplexed video decoding apparatus 20.

The packet demultiplexing unit 21, working in conjunction with the system packet processing unit 22, identifies, based on the header information of each TS packet, the type of the data contained in the payload part of the TS packet. Then, the packet demultiplexing unit 21 passes the video PES packets, audio PES packets, and PSI information to the video packet processing unit 24, the audio packet processing unit 26, and the system packet processing unit 22, respectively. Further, the packet demultiplexing unit 21 passes the PCR value carried in the TS header to the control unit 23 together with its byte position information.

The system packet processing unit 22 processes the PSI information carried in the payload part of the system TS packet, acquires the PIDs of the video and audio data contained in the program to be decoded, and passes the PIDs to the packet demultiplexing unit 21. The system packet processing unit 22 also passes the SubPicLowDelayFlag parameter defined in the PMT to the ultra-low delay decoding determining unit 28.

The video packet processing unit 24 extracts the encoded video data contained in the payload of each video PES packet stored in the payload of the video TS packet received from the packet demultiplexing unit 21, and passes the encoded video data to the video decoding unit 25. Further, the video packet processing unit 24 passes the picture display/decode time information retrieved from the PES packet to the control unit 23.

The audio packet processing unit 26 extracts the encoded audio data contained in the payload of each audio PES packet stored in the payload of the audio TS packet received from the packet demultiplexing unit 21, and passes the encoded audio data to the audio decoding unit 27. Further, the audio packet processing unit 26 passes the audio frame display/decode time information retrieved from the PES packet to the control unit 23.

Like the control unit 15 in the video multiplexing apparatus 10, the control unit 23 has a 27-MHz reference clock STC. The control unit 23 decodes the STC value based on the PCR value received from the packet demultiplexing unit 21, and performs processing for synchronization. Further, the control unit 23 determines the decode time and display time at which to decode and display the picture and the audio frame, based on the picture display/decode time information received from the video packet processing unit 24 and the audio frame display/decode time information received from the audio packet processing unit 26. When the decode time and the display time become equal to the STC value, the control unit 23 issues decode/display instructions to the video decoding unit 25 and the audio decoding unit 27, respectively.

The video decoding unit 25 and the audio decoding unit 27 each decode the picture or audio frame in accordance with the decode instruction from the control unit 23, and output the decoded picture or decoded audio frame in accordance with the display instruction from the control unit 23.

The ultra-low delay decoding determining unit 28 determines whether ultra-low delay decoding is to be applied or not, based on the flag SubPicLowDelayFlag passed from the system packet processing unit 22, on the presence or absence of an ultra-low delay decode instruction from an apparatus (not depicted) external to the multiplexed video decoding apparatus 20, and on information indicating whether or not the video decoding unit 25 is capable of ultra-low delay decoding. If the flag SubPicLowDelayFlag is "0", and if the ultra-low delay decode instruction is received, then if the video decoding unit 25 is capable of ultra-low delay decoding, the ultra-low delay decoding determining unit 28 instructs the control unit 23 to perform ultra-low delay decoding operation. Otherwise, the ultra-low delay decoding determining unit 28 does not instruct the control unit 23 to perform ultra-low delay decoding operation.

Next, a method of deriving the decode time and display time for each picture and for each audio frame in the multiplexed video decoding apparatus 20 according to the first embodiment will be described. The following description is given by assuming the case where the flag SubPicLowDelayFlag is "0", i.e., the case where picture reordering is not performed, and DTS is not present in the video PES packet. On the other hand, when the flag SubPicLowDelayFlag is "1", the decode time and display time of each picture and each audio frame are derived in accordance with a method defined in the AVC standard or HEVC standard.

When the ultra-low delay decoding determining unit 28 determines that ultra-low delay decoding is not to be applied, the decode time and display time of each picture and each audio frame are derived in the following manner. The video decoding unit 25 and the audio decoding unit 27 obtain the time VideoDecDelay needed to decode one picture and the time AudioDecDelay needed to decode one audio frame, respectively. The video decoding unit 25 and the audio decoding unit 27 each determine the time information, based on the parameter (for example, picture size or audio frame length) carried in the first AU of the encoded video data or the encoded audio data, respectively. For example, the time VideoDecDelay and the time AudioDecDelay represent one picture time and one audio frame time, respectively. The resolution of the time VideoDecDelay and the time AudioDecDelay may be, for example, 27 MHz or 90 KHz. The video decoding unit 25 passes VideoDecDelay to the control unit 23, and the audio decoding unit 27 passes AudioDecDelay to the control unit 23. The control unit 23 takes VideoDecDelay or AudioDecDelay, whichever is larger, as the decoding delay DecDelay.

The control unit 23 calculates the decode time of each picture in the video data by multiplying the corresponding PTS in the video PES packet by 300 (the resolution is 27 MHz). When the STC value becomes equal to the thus calculated value, the control unit 23 instructs the video decoding unit 25 to decode the picture.

On the other hand, the display time of each picture in the video data is calculated by adding the decoding delay DecDelay to the decode time. When the STC value becomes equal to the thus calculated value, the control unit 23 instructs the video decoding unit 25 to display the picture.

The control unit 23 calculates the decode time of each audio frame in the audio data by multiplying the corresponding PTS in the audio PES packet by 300 (the resolution is 27 MHz). When the STC value becomes equal to the thus calculated value, the control unit 23 instructs the audio decoding unit 27 to decode the audio frame. On the other hand, the display time of each audio frame in the audio data is calculated by adding the decoding delay DecDelay to the decode time. When the STC value becomes equal to the thus calculated value, the control unit 23 instructs the audio decoding unit 27 to output the audio frame.

On the other hand, when the ultra-low delay decoding determining unit 28 determines that ultra-low delay decoding is to be applied, the decode time and display time of each picture and each audio frame are derived in the following manner. The control unit 23 calculates the decode time of each picture in the video data by first multiplying the corresponding PTS in the video PES packet by 300 and then subtracting AdditionalDTSDelta carried in the video PES packet from the result of the multiplication. Further, the control unit 23 calculates the display time of each picture in the video data by first multiplying the corresponding PTS in the video PES packet by 300 and then subtracting SecondPTSDelta carried in the video PES packet from the result of the multiplication.

The control unit 23 calculates the decode time of each audio frame in the audio data by first multiplying the corresponding PTS in the audio PES packet by 300 and then subtracting AdditionalDTSDelta carried in the PES packet from the result of the multiplication. Further, the control unit 23 calculates the display time of each audio frame in the audio data by first multiplying the corresponding PTS in the audio PES packet by 300 and then subtracting SecondPTSDelta carried in the PES packet from the result of the multiplication.

Figure 14:
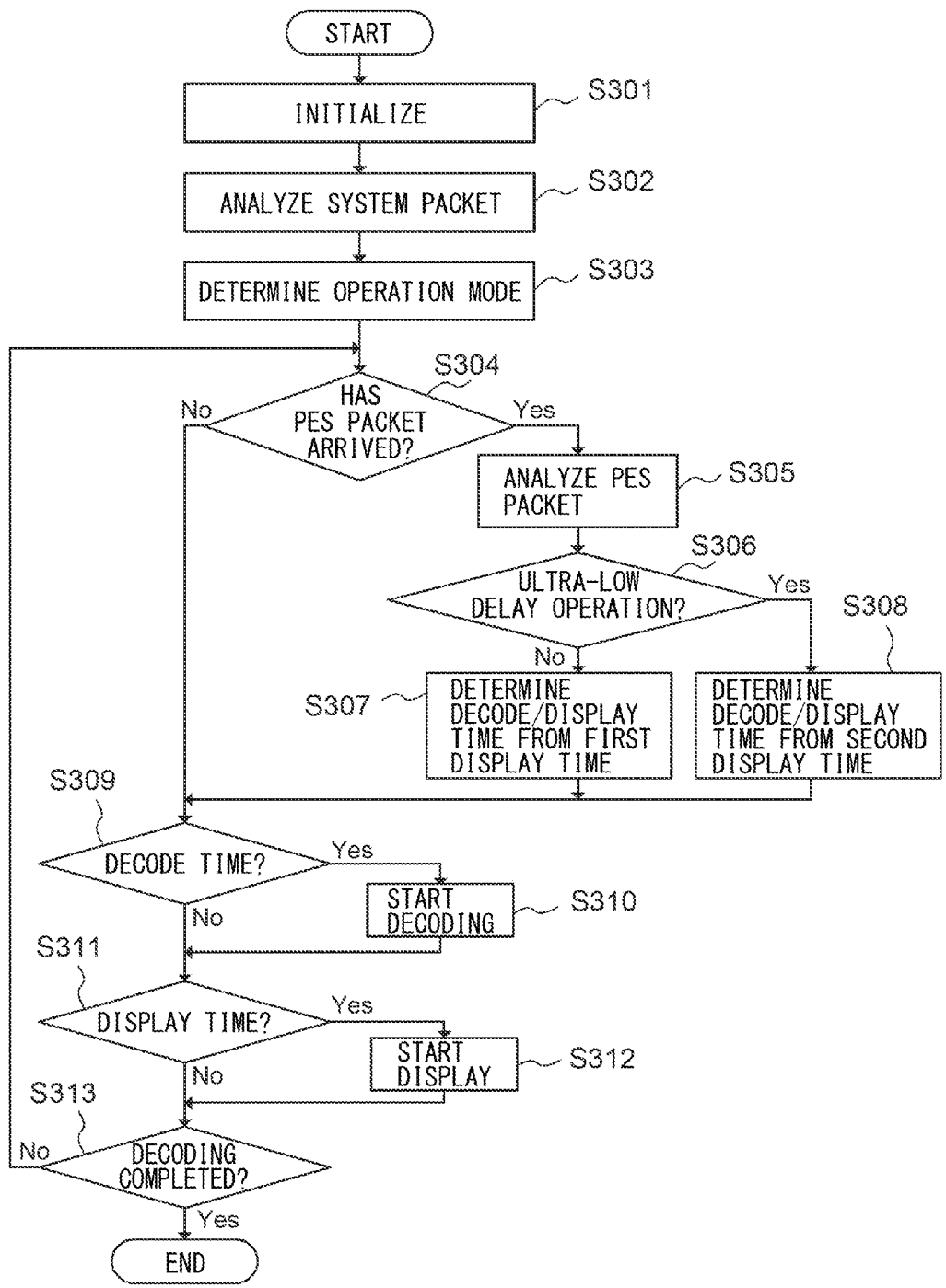
FIG. 14 is a diagram illustrating a process flow of a control unit according to the first embodiment.

FIG. 14 is a diagram illustrating the process flow of the control unit 23 in the multiplexed video decoding apparatus 20 according to the first embodiment. First, the control unit 23 initializes the entire multiplexed video decoding apparatus 20 (step S301). Next, the control unit 23 analyzes each system TS packet in the received multiplexed video data, and acquires the PAT and PMT information contained in the payload of that TS packet (step S302).

Then, the control unit 23 determines whether ultra-low delay decoding is to be applied or not, based on the presence or absence of ultra-low delay encoding identifiable from the PAT and PMT, on the presence or absence of an ultra-low delay decode instruction from an external apparatus, and on information indicating whether or not the video decoding unit 25 is capable of ultra-low delay decoding (step S303).

After that, the control unit 23 determines whether or not a video TS packet carrying the starting data of a video PES packet or an audio TS packet carrying the starting data of an audio PES packet has arrived at the video packet processing unit 24 or the audio packet processing unit 26, respectively (step S304). When the video TS packet carrying the starting data of the video PES packet or the audio TS packet containing the starting data of the audio PES packet has arrived (Yes in step S304), the control unit 23 instructs the video packet processing unit 24 or the audio packet processing unit 26 to analyze the PES packet (step S305). If the type of the arriving PES packet is the video PES packet, the video packet processing unit 24 reads out each of the fields starting from the head of the PES packet and proceeding up to the field immediately preceding the PESPacketDataByte field, and analyzes each readout field. On the other hand, if the type of the arriving PES packet is the audio PES packet, the audio packet processing unit 26 reads out each of the fields starting from the head of the PES packet and proceeding up to the field immediately preceding the PESPacketDataByte field, and analyzes each readout field. The video packet processing unit 24 or the audio packet processing unit 26 acquires the PTS depicted in FIG. 10, and also acquires DTS, SecondPTSDelta, and AdditionalDTSDelta, if present.

Next, the control unit 23 checks to see if it is determined in step S303 that ultra-low delay decoding is to be applied (step S306). If it is determined that ultra-low delay decoding is not to be applied (No in step S306), the control unit 23 determines, based on the PTS value and the DTS value, the decode time and display time of each picture contained in the video data or each audio frame contained in the audio data (step S307). More specifically, if DTS is present, the control unit 23 calculates the decode time by multiplying the DTS by 300; if DTS is not present, the decode time is calculated by multiplying the PTS by 300. Further, the control unit 23 calculates the display time by adding the decoding delay to the value obtained by multiplying the PTS by 300. The control unit 23 determines the decoding delay by taking the time needed for the video decoding unit 25 to decode one picture or the time needed for the audio decoding unit 27 to decode one audio frame, whichever is longer.

If it is determined that ultra-low delay decoding is to be applied (Yes in step S306), then the control unit 23 determines, based on the PTS, AdditionalDTSDelta, and SecondPTSDelta, the decode time and display time of each picture contained in the video data or each audio frame contained in the audio data (step S308). More specifically, the control unit 23 calculates the decode time by subtracting AdditionalDTSDelta from the value obtained by multiplying the PTS by 300. Further, the control unit 23 calculates the display time by subtracting SecondPTSDelta from the value obtained by multiplying the PTS by 300.

After step S307 or S308, or after it is determined in step S304 that neither the video TS packet containing the starting data of the video PES packet nor the audio TS packet containing the starting data of the audio PES packet has arrived (No in step S304), the control unit 23 determines whether or not its own STC value matches the decode time of any picture in the video data or any audio frame in the audio data (step S309).

If the STC value of the control unit 23 matches one or the other of the decode times (Yes in step S309), the control unit 23 instructs the video decoding unit 25 or the audio decoding unit 27 to start decoding the picture or audio frame having that decode time (step S310).

After step S310, or after it is determined in step S309 that the STC value of the control unit 23 matches neither of the decode times (No in step S309), the control unit 23 determines whether or not its own STC value matches the display time of any picture in the video data or any audio frame in the audio data (step S311).

If the STC value of the control unit 23 matches one or the other of the display times (Yes in step S311), the control unit 23 instructs the video decoding unit 25 or the audio decoding unit 27 to start displaying the picture or audio frame having the decode time that matches the STC value (step S312).

After step S312, or after it is determined in step S311 that the STC value of the control unit 23 matches neither of the display times (No in step S311), the control unit 23 determines whether the decoding of the multiplexed video data has been completed or not (step S313). For example, if there is no longer any multiplexed video data arriving, or if a decoding terminate instruction is received from an external apparatus, the control unit 23 determines that the decoding of the multiplexed video data has been completed. If the decoding of the multiplexed video data has not been completed yet (No in step S313), the control unit 23 returns to step S304 to repeat the above process. On the other hand, if the decoding of the multiplexed video data has been completed (Yes in step S313), the control unit 23 terminates the decoding process.

Figure 15:
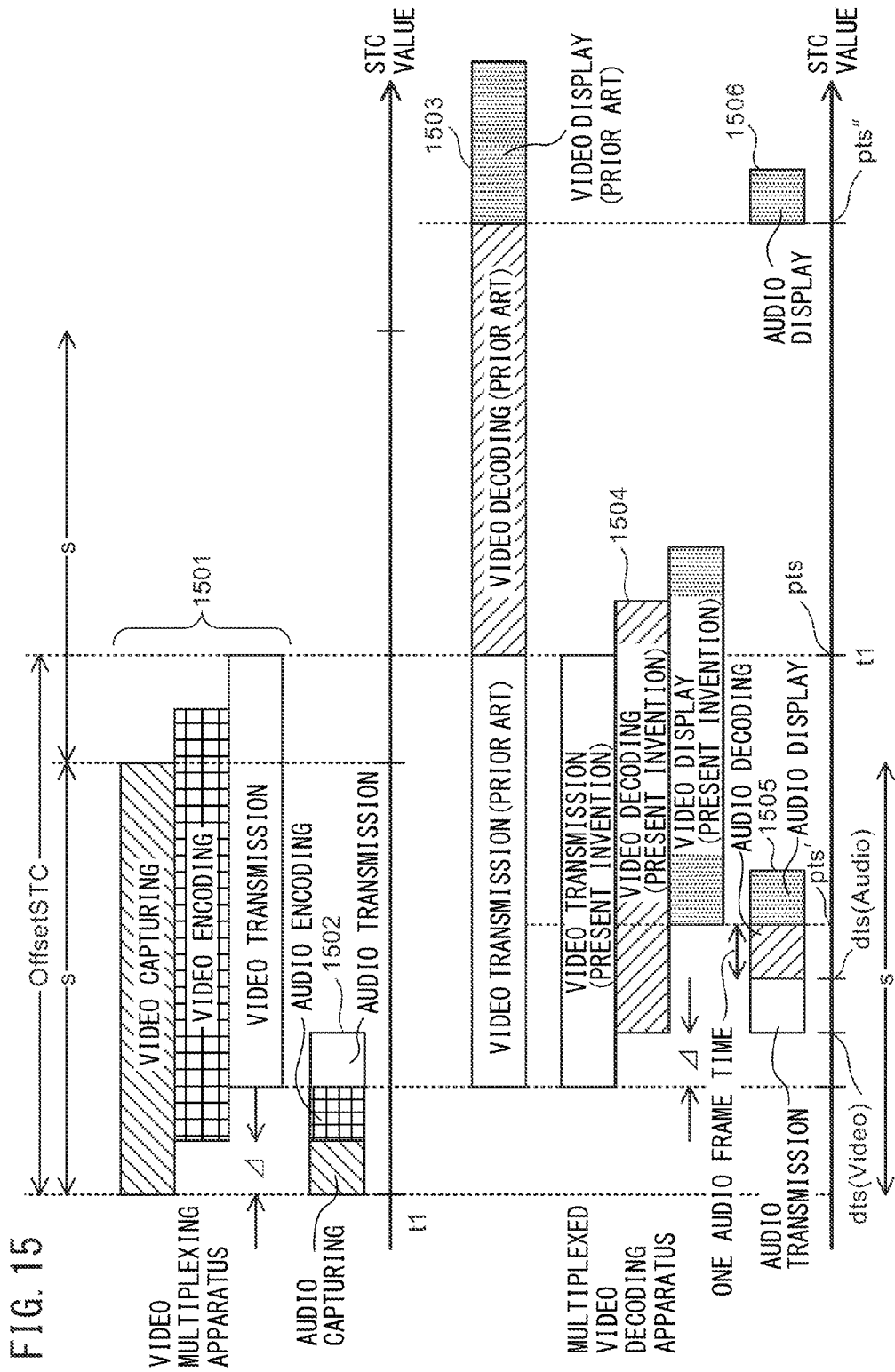
FIG. 15 is a diagram illustrating how codec delay is reduced according to the first embodiment.

Referring to FIG. 15, an explanation will be given of how the codec delay is reduced according to the first embodiment. In FIG. 15, the horizontal axis represents the elapsed time expressed in STC value. Block 1501 indicates the timings for capturing, encoding, and transmitting one picture when the video encoding unit 11 in the video multiplexing apparatus 10 encodes the video data in accordance with the DU-by-DU encoding method depicted in FIG. 4. In FIG. 15, $\Delta$ corresponds to (1 s/M) in FIG. 5.

Block 1502 indicates the timings for capturing, encoding, and transmitting one audio frame by the audio encoding unit 13 in the video multiplexing apparatus 10. In the illustrated example, it is assumed that one audio frame time is equal to $\Delta$. The capturing of both picture and audio samples starts at t1.

Block 1503 indicates the timings for transmitting, decoding, and displaying one picture when the video decoding unit 25 in the multiplexed video decoding apparatus 20 decodes the picture without performing ultra-low delay operation. These timings are the same as the picture transmission, decoding, and display timings when the picture is decoded according to the decoding method defined in the existing standard such as AVC. The time at which the STC of the control unit 23 becomes equal to t1 is the picture decode time pts. The video decoding unit 25 starts decoding the picture at time t1, and ends the decoding of the picture at time pts" when one picture time s has elapsed, whereupon the display of the picture is started. The codec delay in this case is (2 s+2$\Delta$).

Block 1504 indicates the timings for transmitting, decoding, and displaying one picture when the video decoding unit 25 in the multiplexed video decoding apparatus 20 decodes the picture by performing ultra-low delay decoding operation according to the first embodiment.

The decoding of the picture can be started at time dts which is earlier by ((M−1)s/M) than the time at which the STC of the control unit 23 becomes equal to t1. On the other hand, the display of the picture can be started at time pts' which is earlier by ((M−3)s/M) than the time t1. Accordingly, the codec delay in this case is 5$\Delta$=(5 s/M). Thus, it can be seen that, according to the first embodiment, the codec delay can be greatly reduced compared with the prior art. When the video multiplexing apparatus does not perform ultra-low delay encoding, the time interval from the time the capturing of the picture is started to the time the transmission of the encoded picture is started increases to 2 s, and thus the codec delay further increases.

Block 1505 indicates the timings for transmitting, decoding, and displaying one audio frame when the audio decoding unit 27 decodes the audio frame by performing ultra-low delay decoding operation. In the illustrated example, since the capture time is the same for both the picture and the audio frame, the encoded video data and the encoded audio data are multiplexed together so that the display time also becomes the same for both data. When the video multiplexing apparatus 10 does not perform ultra-low delay encoding, generally the arrival time of the last bit in the encoded audio frame data is later than pts'.

Block 1506 indicates the output timing of the decoded audio data when ultra-low delay decoding operation is not performed. The encoded audio data arrives earlier than time t1, but since the video display start time is (t1+s), the control unit 23 performs control to delay the output timing of the audio data so that the audio and the picture can be presented for display at the same time. The decode time may be set earlier by $\Delta$ than the audio data.

As has been described above, according to the first embodiment, the video multiplexing apparatus and the multiplexed video decoding apparatus can support not only the encoding and decoding that conforms to the existing standards but also the ultra-low delay encoding and decoding that reduces the codec delay to one picture time.

Next, a video multiplexing apparatus and a multiplexed video decoding apparatus according to a second embodiment will be described. The second embodiment differs from the first embodiment in the storage location of the flag stored in the TS packet to indicate whether ultra-low delay encoding has been done or not. Otherwise, the packet structure, the operation of the video multiplexing apparatus, and the operation of the multiplexed video decoding apparatus are the same as those in the first embodiment.

Figure 16:
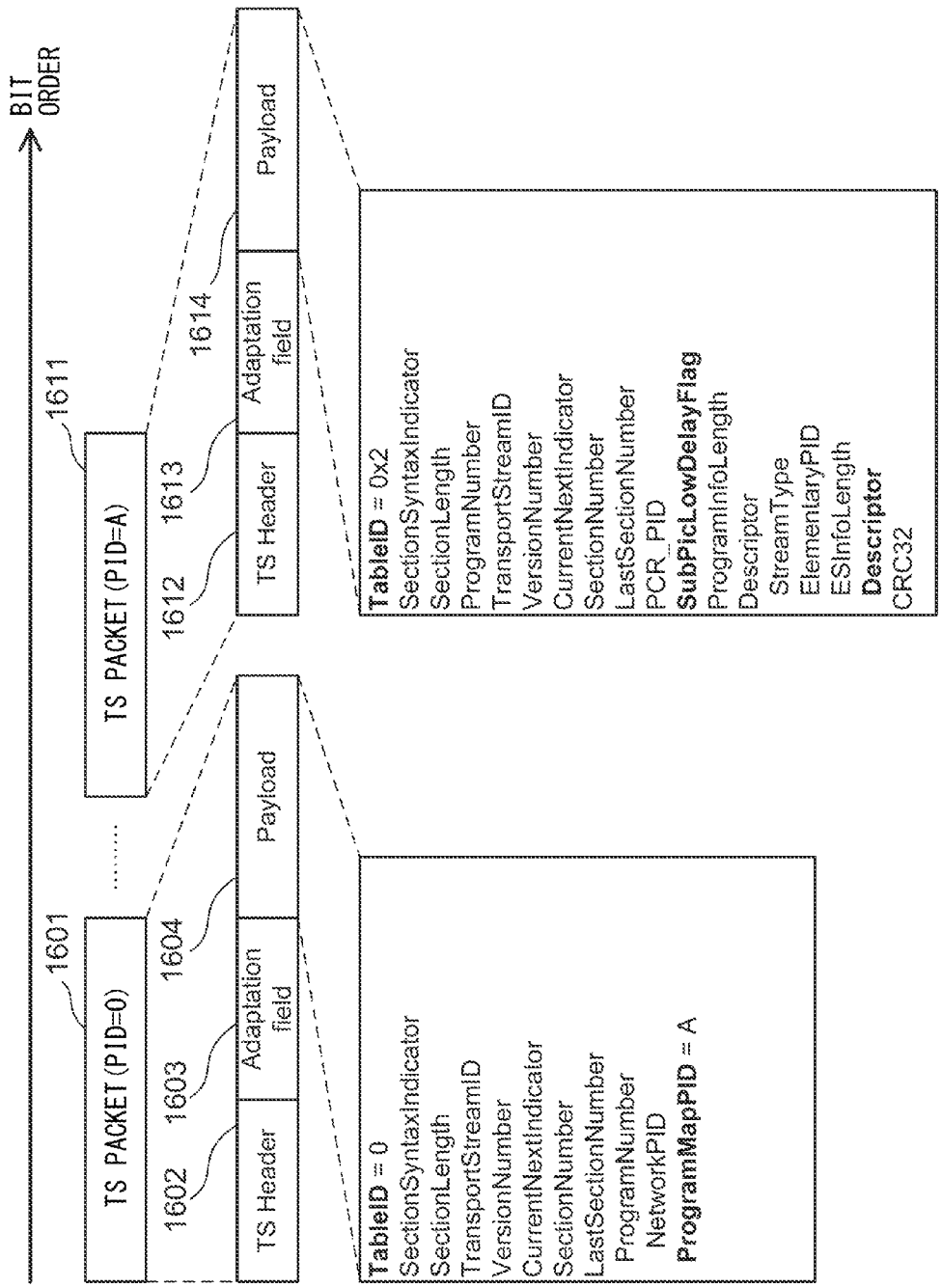
FIG. 16 is a diagram illustrating the structure of PAT and PMT according to a second embodiment.

The difference between the first and second embodiments will be described below. FIG. 16 is a diagram illustrating the data structure of a system TS packet according to the second embodiment. In the present embodiment, the system TS packet 1601 contains a TS header 1602, an adaptation field 1603, and a payload 1604 in this order from the head thereof, as in the system TS packet 801 depicted in FIG. 8. These fields contained in the system TS packet 1601 are identical to the corresponding fields in the system TS packet 801.

Figure 8:
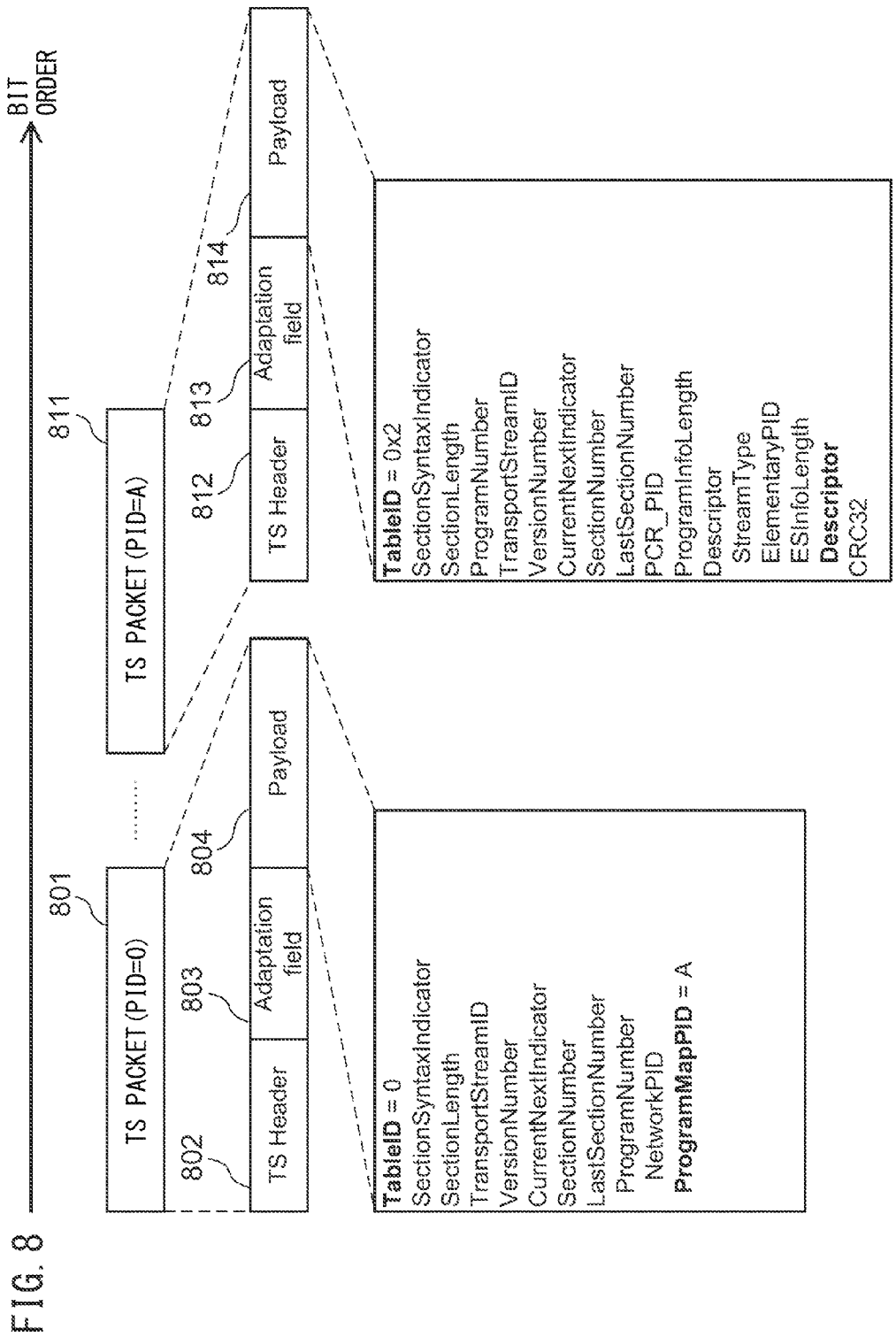
FIG. 8 is a diagram schematically illustrating the structure of PAT and PMT according to the first embodiment.

On the other hand, the TS packet 1611, which carries PMT in its payload, contains a TS header 1612, an adaptation field 1613, and a payload 1614 in this order from the head thereof, as in the TS packet 811 depicted in FIG. 8. In the present embodiment, in the payload 1614 that describes the field structure of the PMT, the flag SubPicLowDelayFlag that indicates the presence or absence of ultra-low delay encoding is located before the loop from StreamType to Descriptor that describe information of each elementary stream. In the illustrated example, the flag SubPicLowDelayFlag is placed immediately before ProgramInfoLength, but may be placed in some other suitable location. However, in order to guarantee compatibility with the MPEG-2 Systems standard for the amount of bits from TableID to ProgramInfoLength, it is preferable to replace one of the reserved bits (not depicted in FIG. 16) by the flag SubPicLowDelayFlag. The reserved bits in the MPEG-2 Systems standard are used to byte-align the fields so that the amount of the encoded data as a whole can be defined in units of bytes and so that the fields each having a length defined in units of bits can be accessed on a byte-by-byte basis. In the illustrated example, AlternativePTSDTS-Flag depicted in FIG. 10 is not present in the PES packet, and whether SecondPTSDelta and AdditionalDTSDelta are present or not is indicated by the flag SubPicLowDelayFlag in the PMT.

Next, a video multiplexing apparatus and a multiplexed video decoding apparatus according to a third embodiment will be described. The third embodiment differs from the first embodiment in that the decode time and display time of each picture or audio frame, which are referred to when performing ultra-low delay decoding, are specified directly, rather than being specified as difference values relative to the display time that applies when decoding in accordance with the existing standard. Otherwise, the packet structure, the operation of the video multiplexing apparatus, and the operation of the multiplexed video decoding apparatus are the same as those in the first embodiment.

The difference between the first and third embodiments will be described below. FIG. 17 is a diagram illustrating the structure of an elementary stream PES packet, including video PES packet and audio PES packet, according to the third embodiment.

In the PES packet 1700 illustrated in FIG. 17, SecondPTS and SecondDTS are described instead of SecondPTSDelta and AdditionalDTSDelta (illustrated in FIG. 10) specified as difference values relative to the display time that applies when decoding in accordance with the existing standard. SecondPTS and SecondDTS directly describe the second display time and decode time, respectively, that apply when performing ultra-low delay decoding. In other words, SecondPTS and SecondDTS correspond to dts(Video) (in the case of video data) or dts(Audio) (in the case of audio data) and pts', respectively, in FIG. 15. SecondPTS and SecondDTS may be expressed in units of 90 KHz or in units of 27 MHz.

By using SecondPTS and SecondDTS directly as the second display time and decode time, each unit in the video multiplexing apparatus 10 and multiplexed video decoding apparatus 20 performs the same processing as the processing performed by the corresponding unit in the video multiplexing apparatus 10 and multiplexed video decoding apparatus 20 according to the first embodiment.

Next, a video multiplexing apparatus and a multiplexed video decoding apparatus according to a fourth embodiment will be described. The fourth embodiment differs from the first embodiment in that the second decode time information and display time information, which are referred to when performing ultra-low delay decoding, are described within the PES packet for each DU of the picture. Otherwise, the packet structure, the operation of the video multiplexing apparatus, and the operation of the multiplexed video decoding apparatus are the same as those in the first embodiment.

Figure 18:
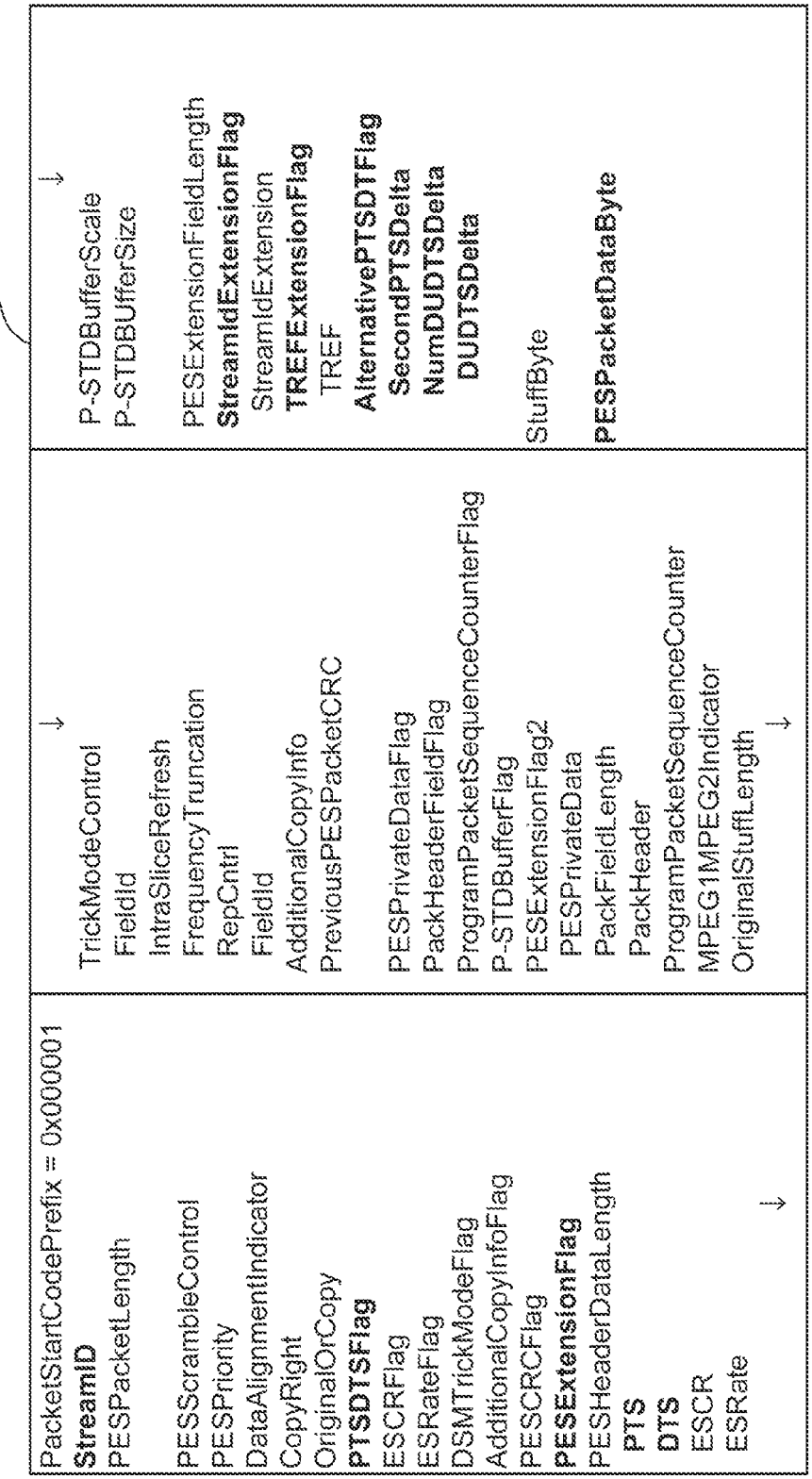
FIG. 18 is a diagram illustrating the structure of a PES packet according to a fourth embodiment.

The difference between the first and fourth embodiments will be described below. FIG. 18 is a diagram illustrating the structure of an elementary stream PES packet, including video PES packet and audio PES packet, according to the fourth embodiment.

Figure 10:
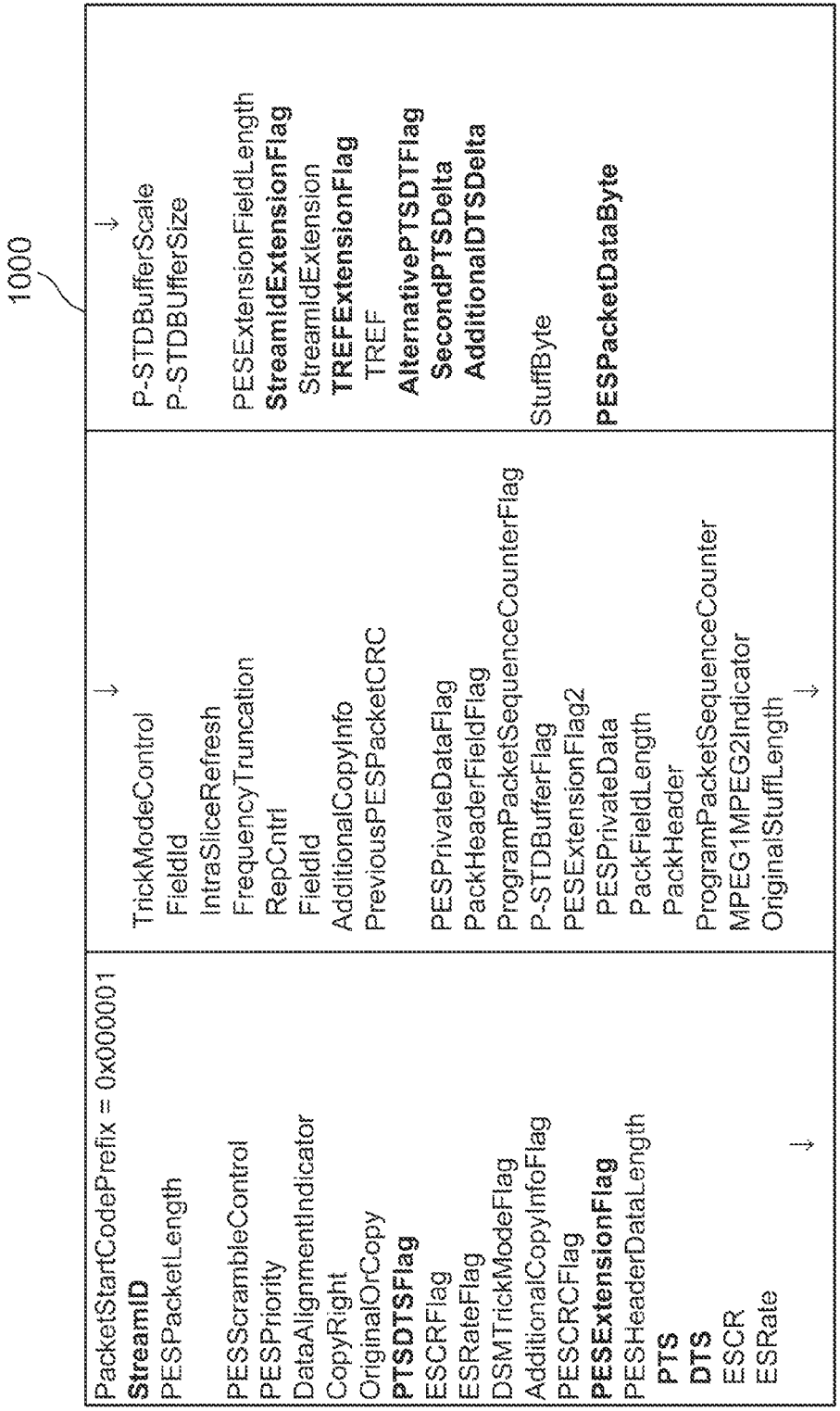
FIG. 10 is a diagram schematically illustrating the structure of a PES packet according to the first embodiment.

The PES packet 1800 depicted in FIG. 18 differs from the PES packet depicted in FIG. 10 by the inclusion of a parameter NumDUDTSDelta field which indicates the number of DUs per access unit (AU) (one picture or one audio frame). Another difference is that, in the PES packet 1800, AdditionalDTSDelay is described for each DU, not for each AU. In the fourth embodiment, as many AdditionalDTSDelay fields are carried as the value of NumDUDTSDelta indicates.

When the PES packet is an audio PES packet, NumDUDTSDelta is set to "1". For audio data, the decode start time and the display start time are always specified on an AU-by-AU basis. This is because the AU is the smallest encoding unit in the case of the audio data. On the other hand, when the PES packet is a video PES packet, NumDUDTSDelta is set to a value calculated by adding 1 to the value of the NumDecodingUnitsMinus1 field contained in the picture timing SEI in the encoded video; i.e., NumDUDTSDelta indicates the number of DUs contained in AU. The decode time of each DU is calculated by subtracting the corresponding AdditionalDTSDelay from the PTS of the video PES packet.

The video packet generating unit 12 in the video multiplexing apparatus 10, under instruction from the control unit 15, generates the video PES packet by including therein NumDUDTSDelta and AdditionalDTSDelay for each DU (i.e., as many AdditionalDTSDelay fields as the value of NumDUDTSDelta indicates).

On the other hand, the control unit 23 in the multiplexed video decoding apparatus 20 instructs the video decoding unit 25 to decode each DU in the picture at its designated decode time. In the decoding process flow illustrated in FIG. 14, the control unit 23 determines the decode time for each DU in step S308. Then, in step S309, the control unit 23 determines for each DU whether or not the decode time of the DU matches the STC value and, if they match, instructs the video decoding unit 25 to start decoding the DU.

Next, a video multiplexing apparatus and a multiplexed video decoding apparatus according to a fifth embodiment will be described. The fifth embodiment differs from the first embodiment in the method of calculating the decode time and display time at which to decode and display the picture and the audio frame when ultra-low delay decoding is performed. Otherwise, the operation of the video multiplexing apparatus and the operation of the multiplexed video decoding apparatus are the same as those in the first embodiment.

The difference between the first and fifth embodiments will be described below. In the fifth embodiment, the audio packet generating unit 12 in the video multiplexing apparatus 10, under instruction from the control unit 15, always sets the value of AdditionalDTSDelay carried in the audio PES packet to "0". The control unit 23, the video decoding unit 25, and the audio decoding unit 27 in the video multiplexing apparatus 10 determine the decode time and display time at which to decode and display the picture and the audio frame in the following manner.

The control unit 23 calculates the picture decode time by subtracting AdditionalDTSDelta from the value obtained by multiplying the PTS in the video PES packet by 300, as in the first embodiment. Further, the control unit 23 calculates the picture display time by first subtracting SecondPTSDelta from the value obtained by multiplying the PTS in the video PES packet by 300, and then adding AudioDecDelay to it. This AudioDecDelay is the time needed for the audio decoding unit 27 to decode one audio frame.

On the other hand, the control unit 23 calculates the audio frame display time by first subtracting SecondPTSDelta from the value obtained by multiplying the PTS in the audio PES packet by 300, and then adding AudioDecDelay to it. Further, the control unit 23 calculates the audio frame decode time by subtracting SecondPTSDelta from the value obtained by multiplying the PTS in the audio PES packet by 300.

Figure 19:
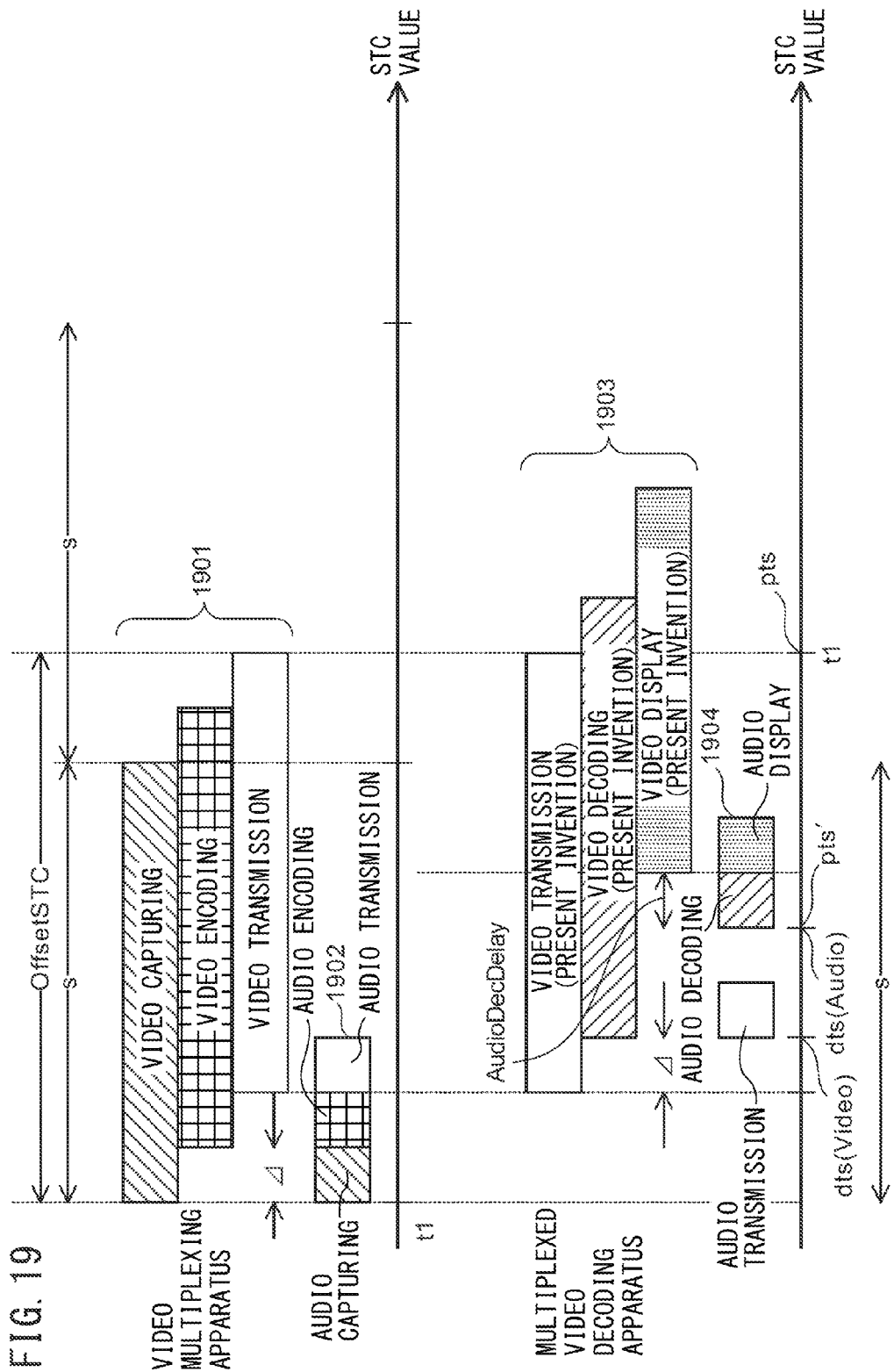
FIG. 19 is a diagram illustrating how codec delay is reduced according to a fifth embodiment.

FIG. 19 is a diagram illustrating the decode and display timings for the video picture and the audio frame according to the fifth embodiment.

Block 1901, like the block 1501 depicted in FIG. 15, indicates the timings for capturing, encoding, and transmitting one picture when encoding the video data in accordance with the DU-by-DU encoding method depicted in FIG. 4. Block 1902, like the block 1502 depicted in FIG. 15, indicates the timings for capturing, encoding, and transmitting one audio frame. The capturing, encoding, and transmission timings in the video multiplexing apparatus according to the fifth embodiment are the same as the capturing, encoding, and transmission timings according to the first embodiment.

Block 1903 indicates the timings for transmitting, decoding, and displaying one picture when the video decoding unit 25 in the multiplexed video decoding apparatus 20 decodes the picture by performing ultra-low delay decoding operation according to the fifth embodiment. On the other hand, block 1904 indicates the timings for transmitting, decoding, and displaying one audio frame when the audio decoding unit 27 decodes the audio frame by performing ultra-low delay decoding operation according to the fifth embodiment. The audio frame decode time dts, which is, in the illustrated example, the time delayed by AudioDecDelay from the first display/decode time of the audio frame described in the multiplexed video data, corresponds to the time at which the audio decoding unit 27 actually outputs the audio frame.

Next, a video multiplexing apparatus and a multiplexed video decoding apparatus according to a sixth embodiment will be described. The sixth embodiment differs from the first embodiment in that the PES packet is generated for each DU. Otherwise, the packet structure, the operation of the video multiplexing apparatus, and the operation of the multiplexed video decoding apparatus are the same as those in the first embodiment.

Figure 20:
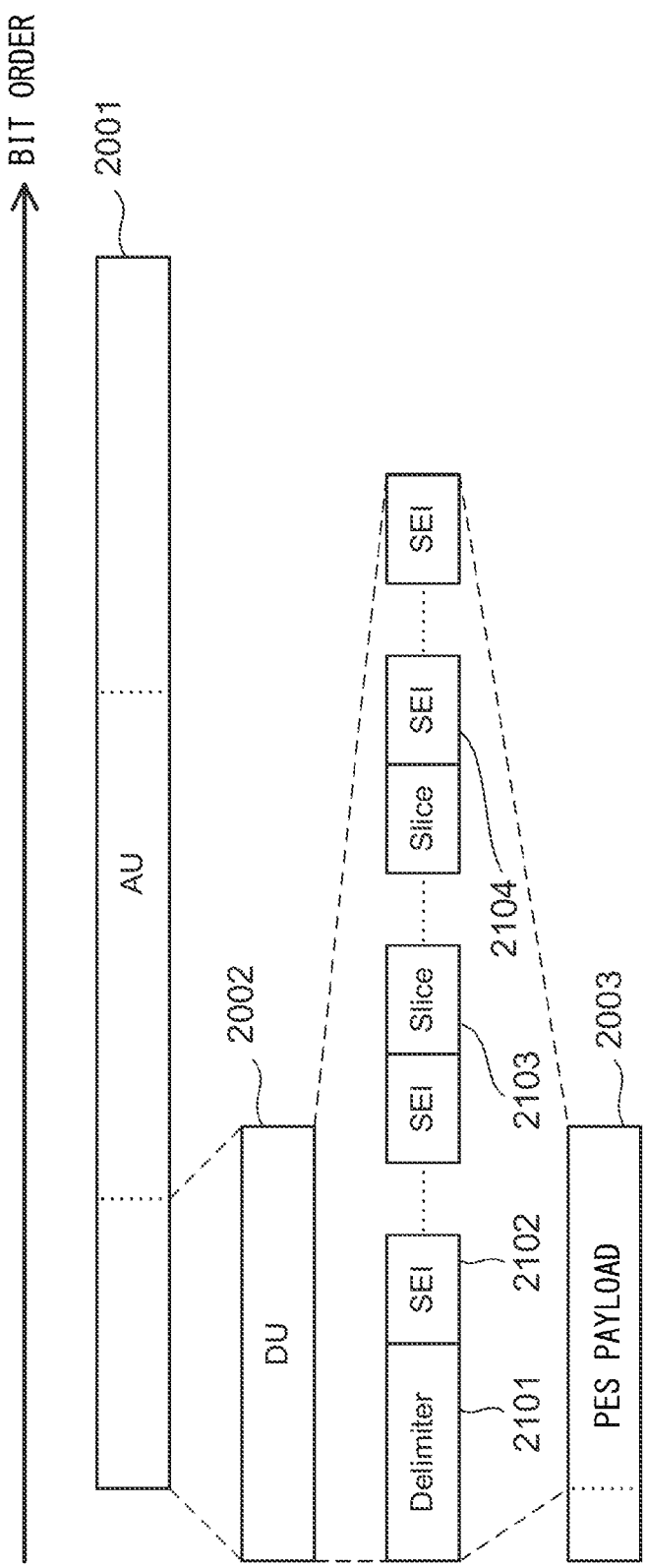
FIG. 20 is a diagram illustrating the structure of a video TS packet according to a sixth embodiment.

The difference between the first and sixth embodiments will be described below. FIG. 20 is a diagram illustrating the structure of a video TS packet according to the sixth embodiment.

AU 2001 corresponds to one picture, and contains one or more DUs 2002. Each DU 2002 is a set of a plurality of NALs including at least one slice NAL. Each DU 2002 carries a delimiter NAL 2101 (only the first DU in the AU may carry a delimiter NAL), a SEI NAL 2102 (zero or one or more in number), a slice NAL 2103 (at least one in number), and a SEI NAL 2104 (zero or one or more in number). The number of DUs contained in the AU and the number of NALs contained in each DU are described in the picture timing SEI of the AU. One PES packet 2003 stores at least one DU 2002.

The PES packet structure according to the sixth embodiment is the same as the PES packet structure depicted in FIG. 17. In the present embodiment, the values and meanings of the various fields contained in the PES packet 1700 are as follows:

PTS: This field stores the value of the first PTS of the AU that contains this DU. Every DU contained in the AU has the same PTS.

DTS: This field is not used. Or, the same value as that of the PTS may be stored in the DTS.

SubPicLowDelayFlag: This field is set to "0" when SecondPTS and SecondDTS are present.

SecondDTS: This field stores the DTS of this DU.

SecondPTS: This field describes the output start time of the pixels contained in this DU. For example, when each DU is encoded as illustrated in FIG. 4, the value of SecondPTS is equal to the sum of SecondDTS and (2 s/M). Alternatively, the value of SecondPTS may not be explicitly described for each DU, but the value of SecondPTS of the first DU in the AU may be used. In that case, the video decoding unit 25 calculates the second PTS of this DU by adding to the value of SecondPTS of the first DU in the AU the value obtained by subtracting the value of SecondDTS of the first DU in the AU from the value of SecondDTS of the DU to be decoded.

The video multiplexing apparatus and the multiplexed video decoding apparatus according to any of the second to sixth embodiments, as in the first embodiment, can support not only the encoding and decoding that conforms to the existing standards but also the ultra-low delay encoding and decoding that reduces the codec delay to one picture time.

Figure 21:
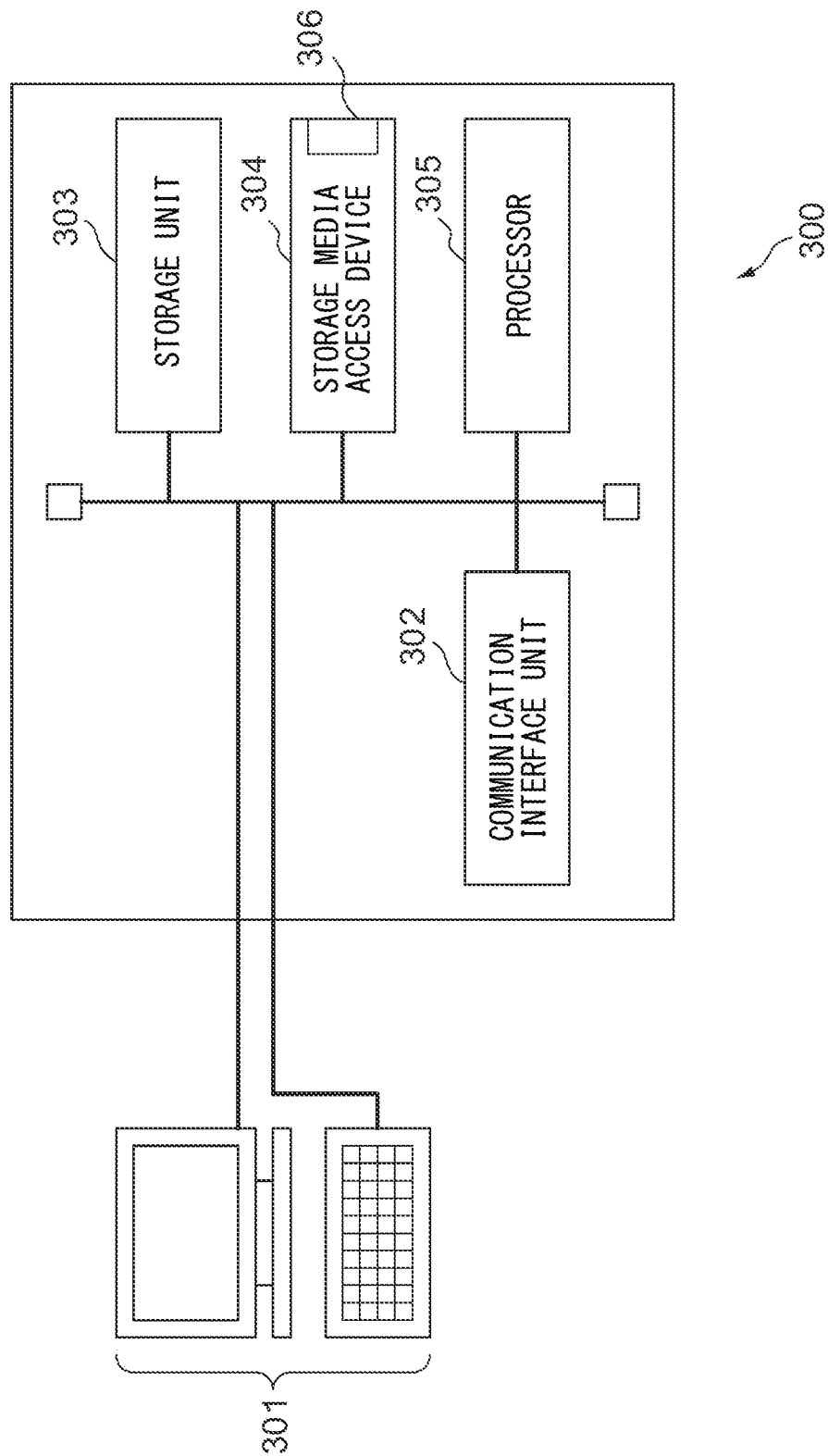
FIG. 21 is a diagram illustrating the video multiplexing apparatus or the multiplexed video decoding unit as implemented on a computer.

FIG. 21 is a diagram illustrating the configuration of a computer that operates as the video multiplexing apparatus or the multiplexed video decoding apparatus by executing a computer program for implementing the functions of the various units in the video multiplexing apparatus or the multiplexed video decoding apparatus according to any one of the above embodiments or their modified examples.

The computer 300 includes a user interface unit 301, a communication interface unit 302, a storage unit 303, a storage media access device 304, and a processor 305. The computer 300 may further include a speaker (not depicted). The processor 305 is connected to the user interface unit 301, communication interface unit 302, storage unit 303, and storage media access device 304, for example, via a bus.

The user interface unit 301 includes, for example, an input device such as a keyboard and a mouse, and a display device such as a liquid crystal display. Alternatively, the user interface unit 301 may include a device, such as a touch panel display, into which an input device and a display device are integrated. The user interface unit 301 generates, for example, in response to a user operation, an operation signal for selecting video data and other media data to be encoded or multiplexed video data to be decoded, and supplies the operation signal to the processor 305. The user interface unit 301 may also display the decoded video data received from the processor 305.

The communication interface unit 302 may include a communication interface for connecting the computer 300 to an apparatus for generating video data and other media data, for example, a video camera, and a control circuit for the communication interface. Such a communication interface may be, for example, a Universal Serial Bus (USB) interface.

Further, the communication interface unit 302 may include a communication interface for connecting to a communication network conforming to a communication standard such as the Ethernet (registered trademark), and a control circuit for the communication interface.

In the latter case, the communication interface unit 302 receives video data and other media data to be encoded, or multiplexed video data to be decoded, from another apparatus connected to the communication network, and passes the received data to the processor 305. Further, the communication interface unit 302 may receive multiplexed video data or decoded video data and other media data from the processor 305 and may transmit the data to another apparatus over the communication network.

The storage unit 303 includes, for example, a readable/writable semiconductor memory and a read-only semiconductor memory. The storage unit 303 stores a computer program for video multiplexing or multiplexed video decoding to be executed on the processor 305, and also stores the data generated as a result of or during the execution of the program.

The storage media access device 304 is a device that accesses a storage medium 306 such as a magnetic disk, a semiconductor memory card, or an optical storage medium. The storage media access device 304 accesses the storage medium 306 to read out, for example, the computer program for video multiplexing or multiplexed video decoding to be executed on the processor 305, and passes the readout computer program to the processor 305.

The processor 305 generates multiplexed video data by executing the video multiplexing computer program according to any one of the above embodiments or their modified examples. The processor 305 then stores the multiplexed video data thus generated in the storage unit 303, or transmits the generated data to another apparatus via the communication interface unit 302. Further, the processor 305 decodes the multiplexed video data by executing the multiplexed video decoding computer program according to any one of the above embodiments or their modified examples. The processor 305 then stores the decoded video data and other media data in the storage unit 303, displays the decoded data on the user interface unit 301, or transmits the decoded data to another apparatus via the communication interface unit 302.

A computer program which is executed on a computer to implement the functions of the various units of the video multiplexing apparatus according to any one of the above embodiments or their modified examples may be distributed in the form stored in a semiconductor memory or in the form recorded on a recording medium such as an optical recording medium. Likewise, a computer program which is executed on a computer to implement the functions of the various units of the multiplexed video decoding apparatus according to any one of the above embodiments or their modified examples may be distributed in the form stored in a semiconductor memory or in the form recorded on a recording medium such as an optical recording medium. The term "recording medium" used here does not include a carrier wave.

The video multiplexing apparatus and the multiplexed video decoding apparatus according to the above embodiments or their modified examples are used in various applications. For example, the video multiplexing apparatus and the multiplexed video decoding apparatus are incorporated in a video camera, a video transmitting apparatus, a video receiving apparatus, a video telephone system, a computer, or a mobile telephone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A video/audio data multiplexing apparatus for multiplexing video data with audio data comprising:
   a control unit which determines, for each picture in the video data and for each frame of the audio data, first decode/display time information and second decode/display time information each for determining the decode time and display time of the picture and the frame;
   a video packet generating unit which appends the first decode/display time information and second decode/display time information for the picture to a video packet that carries encoded data of the video data, the encoded data being generated by encoding the video data without applying frame re-ordering;
   a media packet generating unit which appends the first decode/display time information and second decode/display time information for the frame to a media packet that carries encoded data of the audio data; and
   a packet multiplexing unit which generates a data stream by multiplexing the video packet and the media packet and outputs the data stream, wherein
   the first decode/display time information includes information indicating a time at which to display the video data and the audio data in synchronized fashion when the decoding unit of the video data is a picture,
   the second decode/display time information includes information indicating a time at which to display the video data and the audio data in synchronized fashion when the decoding unit of the video data is a sub-picture obtained by dividing the picture into a plurality of sub-pictures and information indicating a sub-picture decoding time needed to decode the sub-picture, and
   the decode time and display time of the picture determined based on the second decode/display time information are earlier than the decode time and display time of the picture determined based on the first decode/display time information.

2. The video/audio data multiplexing apparatus according to claim 1, wherein when the decoding unit of the video data is the sub-picture, the packet multiplexing unit multiplexes the video packet and the media packet so as to ensure that, for each picture in the video data, the encoded data corresponding to the first sub-picture in the picture and the encoded data of the frame of the audio data corresponding to the picture will arrive at a decoding apparatus for decoding the data stream, at a time that is earlier than or the same as the decode time of the picture determined based on the second decode/display time information.

3. The video/audio data multiplexing apparatus according to claim 2, wherein
   the decode time of the picture determined based on the second decode/display time information is earlier than the decode time of the picture determined based on the first decode/display time information by an amount of time obtained by subtracting the sub-picture decoding time from the time needed to decode the entire picture.

4. The video/audio data multiplexing apparatus according to claim 3, wherein the second decode/display time information includes information indicating as the display time of the picture a time that is later than the decode time of the picture determined based on the second decode/display time information by an amount of time needed to decode two sub-pictures starting from the first sub-picture in the picture.

5. The video/audio data multiplexing apparatus according to claim 1, wherein the video packet generating unit appends information indicating the decode time and display time of the first sub-picture in the picture as the second decode/display time information to the video packet.

6. The video/audio data multiplexing apparatus according to claim 1, wherein the video packet generating unit appends information indicating the decode time and display time for each sub-picture as the second decode/display time information to the video packet.

7. A multiplexed video/audio data decoding apparatus for decoding multiplexed data generated by multiplexing encoded video data with encoded audio data, the encoded video data being Generated by encoding video data without applying frame re-ordering, comprising:
- a control unit which determines decode time and display time for each picture in the video data and for each frame of the audio data contained in the multiplexed data, based on first decode/display time information and second decode/display time information each for determining the decode time and display time of the picture and the frame;
- a video decoding unit which, for each picture, starts to decode the picture in accordance with the decode time determined for the picture and starts to display the picture in accordance with the display time determined for the picture; and
- a media decoding unit which, for each frame, starts to decode the frame in accordance with the decode time determined for the frame and starts to output the frame in accordance with the display time determined for the frame, wherein
- the first decode/display time information includes information indicating a time at which to display the video data and the audio data in synchronized fashion when the decoding unit of the video data is a picture,
- the second decode/display time information includes information indicating a time at which to display the video data and the audio data in synchronized fashion when the decoding unit of the video data is a sub-picture obtained by dividing the picture into a plurality of sub-pictures and information indicating a sub-picture decoding time needed to decode the sub-picture, and
- the decode time and display time of the picture determined based on the second decode/display time information are earlier than the decode time and display time of the picture determined based on the first decode/display time information.

8. The multiplexed video/audio data decoding apparatus according to claim 7, wherein when the decoding unit of the video data is the sub-picture, and when the video decoding unit can start to display the picture at the display time of the picture determined based on the second decode/display time information, the control unit determines the decode time and display time of each picture based on the second decode/display time information for each picture, and determines the decode time and display time of each frame based on the second decode/display time information for each frame.

9. The multiplexed video/audio data decoding apparatus according to claim 8, wherein
the control unit sets the decode time of the picture determined based on the second decode/display time information to a time that is earlier than the decode time of the picture determined based on the first decode/display time information by an amount of time obtained by subtracting the sub-picture decoding time from the time needed to decode the entire picture.

10. The multiplexed video/audio data decoding apparatus according to claim 9, wherein the second decode/display time information includes information indicating as the display time of the picture a time that is later than the decode time of the picture determined based on the second decode/display time information by an amount of time needed to decode two sub-pictures starting from the first sub-picture in the picture.

11. The multiplexed video/audio data decoding apparatus according to claim 7, wherein the second decode/display time information is information indicating the decode time and display time of the first sub-picture in the picture.

12. The multiplexed video/audio data decoding apparatus according to claim 7, wherein the second decode/display time information includes information indicating the decode time and display time for each sub-picture.

13. A video/audio data multiplexing method for multiplexing video data with audio data, and for outputting the multiplexed data, comprising:
- determining, for each picture in the video data and for each frame of the audio data, first decode/display time information and second decode/display time information each for determining the decode time and display time of the picture and the frame;
- appending the first decode/display time information and second decode/display time information for the picture to a video packet that carries encoded data of the video data, the encoded data being generated by encoding the video data without applying frame re-ordering;
- appending the first decode/display time information and second decode/display time information for the frame to a media packet that carries encoded data of the audio data; and
- generating a data stream by multiplexing the video packet and the media packet, and outputting the data stream, wherein
- the first decode/display time information includes information indicating a time at which to display the video data and the audio data in synchronized fashion when the decoding unit of the video data is a picture,
- the second decode/display time information includes information indicating a time at which to display the video data and the audio data in synchronized fashion when the decoding unit of the video data is a sub-picture obtained by dividing the picture into a plurality of sub-pictures and information indicating a sub-picture decoding time needed to decode the sub-picture, and
- the decode time and display time of the picture determined based on the second decode/display time information are earlier than the decode time and display time of the picture determined based on the first decode/display time information.

14. The video/audio data multiplexing method according to claim 13, wherein when the decoding unit of the video data is the sub-picture, the generating the data stream multiplexes the video packet and the media packet so as to ensure that, for each picture in the video data, the encoded data corresponding to the first sub-picture in the picture and the encoded data of the frame of the audio data corresponding to the picture will arrive at a decoding apparatus for decoding the data stream, at a time that is earlier than or the same as the decode time of the picture determined based on the second decode/display time information.

15. The video/audio data multiplexing method according to claim 14, wherein
the decode time of the picture determined based on the second decode/display time information is earlier than the decode time of the picture determined based on the first decode/display time information by an amount of time obtained by subtracting the sub-picture decoding time from the time needed to decode the entire picture.

16. The video/audio data multiplexing method according to claim 15, wherein the second decode/display time information includes information indicating as the display time of the picture a time that is later than the decode time of the picture determined based on the second decode/display time information by an amount of time needed to decode two sub-pictures starting from the first sub-picture in the picture.

17. A multiplexed video/audio data decoding method for decoding multiplexed data generated by multiplexing encoded video data with encoded audio data, the encoded video data being generated by encoding video data without applying frame re-ordering, comprising:
  determining decode time and display time for each picture in the video data and for each frame of the audio data contained in the multiplexed data, based on first decode/display time information and second decode/display time information each for determining the decode time and display time of the picture and the frame;
  for each picture, starting to decode the picture in accordance with the decode time determined for the picture, and starting to display the picture in accordance with the display time determined for the picture; and
  for each frame, starting to decode the frame in accordance with the decode time determined for the frame, and starting to output the frame in accordance with the display time determined for the frame, wherein
  the first decode/display time information includes information indicating a time at which to display the video data and the audio data in synchronized fashion when the decoding unit of the video data is a picture,
  the second decode/display time information includes information indicating a time at which to display the video data and the audio data in synchronized fashion when the decoding unit of the video data is a sub-picture obtained by dividing the picture into a plurality of sub-pictures and information indicating a sub-picture decoding time needed to decode the sub-picture, and
  the decode time and display time of the picture determined based on the second decode/display time information are earlier than the decode time and display time of the picture determined based on the first decode/display time information.

18. The multiplexed video/audio data decoding method according to claim 17, wherein when the decoding unit of the video data is the sub-picture, and when the starting to display the picture can start to display the picture at the display time of the picture determined based on the second decode/display time information, the determining the decode time and the display time determines the decode time and display time of each picture based on the second decode/display time information for each picture, and determines the decode time and display time of each frame based on the second decode/display time information for each frame.

19. The multiplexed video/audio data decoding method according to claim 18, wherein
  the determining the decode time and the display time sets the decode time of the picture determined based on the second decode/display time information to a time that is earlier than the decode time of the picture determined based on the first decode/display time information by an amount of time obtained by subtracting the sub-picture decoding time from the time needed to decode the entire picture.

20. The multiplexed video/audio data decoding method according to claim 17, wherein the second decode/display time information includes information indicating the decode time and display time for each sub-picture.

* * * * *